(12) United States Patent
Lim et al.

(10) Patent No.: US 10,903,864 B2
(45) Date of Patent: Jan. 26, 2021

(54) ELECTRONIC DEVICE AND OPERATION METHOD THEREFOR

(71) Applicant: SAMSUNG ELECTRONICS CO., LTD., Suwon-si (KR)

(72) Inventors: Sang-Soon Lim, Seoul (KR); Woo-Jin Park, Yongin-si (KR); Dae-Hyun Ban, Seoul (KR); Kyu-Haeng Lee, Seoul (KR); Seong-Won Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/999,790

(22) PCT Filed: Feb. 17, 2017

(86) PCT No.: PCT/KR2017/001798
§ 371 (c)(1),
(2) Date: Aug. 20, 2018

(87) PCT Pub. No.: WO2017/142359
PCT Pub. Date: Aug. 24, 2017

(65) Prior Publication Data
US 2019/0222245 A1   Jul. 18, 2019

(30) Foreign Application Priority Data
Feb. 18, 2016 (KR) .......................... 10-2016-0019177

(51) Int. Cl.
*H04B 1/12* (2006.01)
*H04W 88/06* (2009.01)
(Continued)

(52) U.S. Cl.
CPC ............... *H04B 1/126* (2013.01); *H04B 1/00* (2013.01); *H04M 1/7253* (2013.01);
(Continued)

(58) Field of Classification Search
CPC ............. H04M 1/6066; H04M 1/7253; H04M 1/72522; H04M 1/72527; H04M 1/72569;
(Continued)

(56) References Cited

U.S. PATENT DOCUMENTS 9,198,215 B2* 11/2015 Gantman ............... H04W 88/06
9,432,872 B2*  8/2016 Miryala ............ H04W 28/0263
(Continued)

FOREIGN PATENT DOCUMENTS

EP         2 950 510        12/2015
KR      10-2015-0090790      8/2015
KR      10-2015-0136981     12/2015

OTHER PUBLICATIONS

International Search Report for PCT/KR2017/001798, dated Apr. 28, 2017, 4 pages.
(Continued)

*Primary Examiner* — Magdi Elhag
(74) *Attorney, Agent, or Firm* — Nixon & Vanderhye, P.C.

(57) ABSTRACT

An example operation method for an electronic device having a plurality of antennas including a first antenna and a second antenna is disclosed. According to one embodiment, the operation method for an electronic device can comprise the steps of: communicating with a first external electronic device through the first antenna and the second antenna based on a first communication scheme during a first period; and communicating with the first external electronic device through the first antenna based on the first communication scheme, and with a second external electronic device through the second antenna based on a second communication scheme, during a second period.

15 Claims, 20 Drawing Sheets

(51) Int. Cl.
  *H04M 1/725* (2006.01)
  *H04W 72/12* (2009.01)
  *H04B 1/00* (2006.01)
(52) U.S. Cl.
  CPC ....... *H04W 72/12* (2013.01); *H04W 72/1215* (2013.01); *H04W 88/06* (2013.01)
(58) Field of Classification Search
  CPC ........... H04M 1/72533; H04M 1/7255; H04M 1/72563; H04W 4/008; H04W 72/0453; H04W 72/1215; H04W 88/06; H04W 76/14; H04W 76/15; H04B 1/126; H04B 1/0064
  See application file for complete search history.

(56) References Cited

U.S. PATENT DOCUMENTS

| | | | | |
|---|---|---|---|---|
| 2006/0160563 | A1* | 7/2006 | Ku | H04B 1/406 |
| | | | | 455/552.1 |
| 2006/0194611 | A1* | 8/2006 | Pasternak | H04B 17/18 |
| | | | | 455/553.1 |
| 2007/0161349 | A1 | 7/2007 | Grushkevich | |
| 2008/0090520 | A1* | 4/2008 | Camp | H04B 5/00 |
| | | | | 455/41.2 |
| 2008/0279138 | A1 | 11/2008 | Gonikberg et al. | |
| 2014/0056288 | A1 | 2/2014 | Wyper et al. | |
| 2014/0105198 | A1 | 4/2014 | Banerjea et al. | |
| 2014/0158767 | A1* | 6/2014 | Ramaci | G06K 7/084 |
| | | | | 235/449 |
| 2014/0219193 | A1 | 8/2014 | Linde et al. | |
| 2014/0233536 | A1 | 8/2014 | Kang et al. | |
| 2014/0269553 | A1* | 9/2014 | Stein | H04M 1/72527 |
| | | | | 370/329 |
| 2014/0323048 | A1* | 10/2014 | Kang | H04W 4/80 |
| | | | | 455/41.2 |
| 2015/0180530 | A1 | 6/2015 | Florentinus De Maaijer | |
| 2015/0215901 | A1 | 7/2015 | Lee et al. | |
| 2015/0223272 | A1* | 8/2015 | Parkinson | G10L 19/0017 |
| | | | | 455/41.2 |
| 2015/0347114 | A1 | 12/2015 | Yoon | |
| 2016/0105924 | A1* | 4/2016 | Baek | H04M 1/6066 |
| 2017/0126873 | A1* | 5/2017 | McGary | H04M 1/6066 |

OTHER PUBLICATIONS

Written Opinion of the ISA for PCT/KR2017/001798, dated Apr. 28, 2017, 6 pages.
Extended Search Report dated Jan. 28, 2019 in counterpart European Patent Application No. 17753520.0.

* cited by examiner

ELECTRONIC DEVICE AND OPERATION METHOD THEREFOR

TECHNICAL FIELD

The present disclosure relates to an electronic device and a method for operating the same, for example, an electronic device which communicates with a plurality of external electronic devices through a plurality of antennas in the electronic device, and a method for operating the electronic device.

BACKGROUND ART

Along with the development of wireless communication technology and the daily use of the Internet, an electronic device transmits and receives data at any time to and from other electronic devices by communication.

Accordingly, various types of communication schemes apply to electronic devices.

An electronic device manufacturer or an electronic device application developer manufactures or designs electronic devices such that the electronic devices may operate in one of various communication schemes, in consideration of the distance to a target device for communication, the size of data packets in communication, power consumption for communication, required operations of an electronic device, etc.

Meanwhile, as more and more data have been used for wireless communication, and functions required to use electronic devices have become diverse in recent years, an electronic device communicates simultaneously with a plurality of other devices in different communication schemes in some cases.

DETAILED DESCRIPTION OF THE INVENTION

Technical Problem

As an electronic device simultaneously communicates with a plurality of other devices, the electronic device needs to actively communicate with the plurality of other devices in a plurality of communication schemes.

However, if the electronic device communicates with the plurality of devices in the plurality of communication schemes simultaneously or within a predetermined time period, communication in one of the communication schemes faces the decrease of a communication rate or stability.

Particularly, in the case where a communication chip included in the electronic device is a network combo-chip supporting a plurality of communication schemes, if the electronic device communicates with the plurality of other devices in the plurality of communication schemes, the communication state is affected by the performance of the network combo-chip or the number of antennas used by the network combo-chip. If the network combo-chip uses a plurality of antennas, a single antenna or dual antennas are used according to a used communication scheme. When the electronic device communicates with a plurality of devices in different communication schemes during communication through dual antennas, the communication rate rapidly decreases and the transmission delay time increases.

Accordingly, if an electronic device communicates with a plurality of other devices in a plurality of communication schemes simultaneously or within a predetermined time period, there is a need for maintaining a stable communication state and a specific communication rate.

Particularly, even though a communication chip included in the electronic device is a network combo-chip, there is a need for an electronic device and a method for operating the electronic device, which enable stable communication without significantly decreasing a communication rate, in spite of simultaneous communication in a plurality of communication schemes.

Technical Solution

According to various embodiments of the disclosure, a method for operating an electronic device having a plurality of antennas including a first antenna and a second antenna may include communicating with a first external electronic device through the first antenna and the second antenna based on a first communication scheme during a first period, and communicating with the first external electronic device through the first antenna based on the first communication scheme, and with a second external electronic device through the second antenna based on a second communication scheme, during a second period.

According to various embodiments of the disclosure, a method for operating an electronic device having a plurality of antennas including a first antenna and a second antenna may include communicating with a first external electronic device through the first antenna and the second antenna based on a first communication scheme during a first period, and communicating with a second external electronic device through the first antenna based on a second communication scheme, and with a third external electronic device through the second antenna based on a third communication scheme, during a second period.

According to various embodiments of the disclosure, an electronic device may include a plurality of antennas including a first antenna and a second antenna, a communication module, a memory, and a processor connected electrically to the memory. The memory may store instructions which, when executed, cause the processor configured to control the communication module to communicate through the plurality of antennas based on at least one communication scheme, control the communication module to communicate with a first external electronic device through the first antenna and the second antenna based on a first communication scheme during a first period, and control the communication module to communicate with the first external electronic device through the first antenna based on the first communication scheme, and with a second external electronic device through the second antenna based on a second communication scheme, during a second period.

According to various embodiments of the disclosure, an electronic device may include a plurality of antennas including a first antenna and a second antenna, a communication module, a memory, and a processor connected electrically to the memory. The memory may store instructions which, when executed, cause the processor configured to control the communication module to communicate through the plurality of antennas based on at least one communication scheme, control to communicate with a first external electronic device through the first antenna and the second antenna based on a first communication scheme during a first period, and control the communication module to communicate with a second external electronic device through the first antenna based on a second communication scheme, and with a third external electronic device through the second antenna based on a third communication scheme, during a second period.

Advantageous Effects

According to various embodiments of the disclosure, even though an electronic device communicates with a plurality of other devices in different communication schemes, the communication can be conducted stably without a decrease in a communication rate. Accordingly, the electronic device according to various embodiments of the disclosure can efficiently communicate with the plurality of other electronic devices in a plurality of communication schemes. Further, as information about simultaneous communication with other electronic devices in the plurality of communication schemes is provided in the disclosure, a communication scheme using a single antenna or dual antennas can be maintained.

MODE FOR CARRYING OUT THE INVENTION

Figure 1:
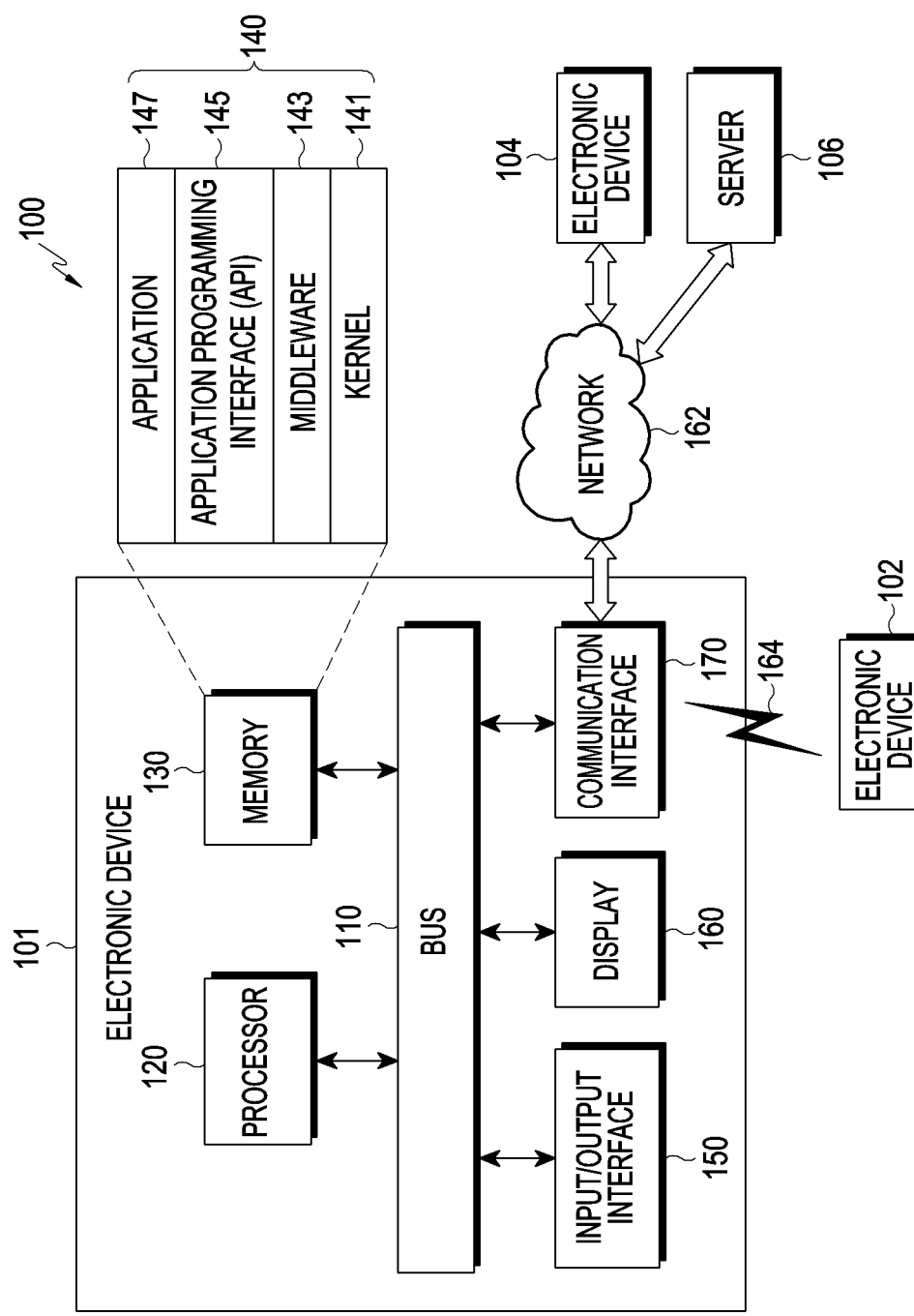
FIG. 1 is a block diagram of an electronic device and a network according to various embodiments of the disclosure.

Various embodiments of the disclosure are described with reference to the accompanying drawings. However, the scope of the disclosure is not intended to be limited to the particular embodiments, and it is to be understood that the disclosure covers various modifications, equivalents, and/or alternatives falling within the scope and spirit of the embodiments of the disclosure. In relation to a description of the drawings, similar reference numerals denote similar components.

In the disclosure, the term "have", "may have", "include", or "may include" signifies the presence of a corresponding feature (e.g., number, function, operation, or component such as part), not excluding the presence of one or more other features.

In the disclosure, the term "A or B", "at least one of A or/and B", or "one or more of A or/and B" may cover all possible combinations of enumerated items. For example, "A or B", "at least one of A and B", or "at least one of A or B" may represent all of the cases of (1) inclusion of at least one A, (2) inclusion of at least one B, and (3) inclusion of at least one A and at least one B.

The term as used in the disclosure, "$1^{st}$", "$2^{nd}$", "first" or "second" may be used for the names of various components irrespective of sequence and/or importance, not limiting the components. These expressions are used to distinguish one component from another component. For example, a first user equipment (UE) and a second UE may indicate different UEs irrespective of sequence or importance. For example, a first component may be referred to as a second component and vice versa without departing the scope of the disclosure.

When it is said that a component (e.g., a first component) is "operatively or communicatively coupled with/to" or "connected to" another component (e.g., a second component), it should be understood that the one component is connected to the other component directly or through any other component (e.g., a third component). On the other hand, when it is said that a component (e.g., a first component) is "directly connected to" or "directly coupled to" another component (e.g., a second component), it may be understood that there is no other component (e.g., a third component) between the components.

The term "configured to" as used herein may be replaced with, for example, the term "suitable for", "having the capacity to", "designed to", "adapted to", "made to", or "capable of" under circumstances. The term "configured to" may not necessarily mean "specifically designed (or configured) to" in hardware. Instead, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations.

The terms as used in the disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the disclosure may not be interpreted as excluding embodiments of the disclosure.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical equipment, a camera, or a wearable device. According to various embodiments, the wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or a tattoo), or an implantable type (e.g., an implantable circuit).

According to some embodiments, an electronic device may be a home appliance. The home appliance may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a TV box. (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, or an Internet of things device (e.g., a lighting bulb, various sensors, an electricity or gas meter, a sprinkler, a fire alarm, a thermostat, a street lamp, a toaster, sports goods, a hot water tank, a heater, a boiler, or the like).

According to some embodiments, an electronic device may include at least one of furniture, part of a building/structure, an electronic board, an electronic signature receiving device, a projector, or various measuring devices (e.g., a water, electricity, gas or electro-magnetic wave measuring device). According to various embodiments, an electronic device may be one or a combination of two or more of the foregoing devices. According to some embodiments, an electronic device may be a flexible electronic device. In addition, an electronic device according to an embodiment of the disclosure is not limited to the foregoing devices, and covers a new electronic device produced along with technology development.

With reference to the attached drawings, an electronic device according to various embodiments will be described below. In the disclosure, the term user may refer to a person or device (e.g., artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication module 170. In some embodiments, at least one of the components may be omitted in the electronic device 101 or a component may be added to the electronic device 101.

The bus 110 may interconnect, for example, the foregoing components 110 to 170, and include a circuit which allows communication (e.g., transmission of control messages and/or data) between the foregoing components.

The processor 120 may include one or more of a CPU, an application processor (AP), or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS).

The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data.

Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147. For example, the middleware 143 may perform scheduling or load balancing for the one or more task requests by processing the one or more task requests according to the priority levels assigned to the at least one application program 147.

The API 145 is an interface that controls functions which, for example, the application programs 147 provide at the kernel 141 or the middleware 143. For example, the API 145 may include at least one interface or function (e.g., a command) for file control, window control, video processing, or text control.

The I/O interface 150 may, for example, act as an interface that provides a command or data received from a user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, or a symbol) to the user. The display 160 may include a touch screen and receive, for example, a touch input, a gesture input, a proximity input, or a hovering input through an electronic pen or a user's body part.

The communication module 170 may establish communication, for example, between the electronic device 101 and an external device (e.g., a first external electronic device 102, a second external electronic device 104, or a server 106). For example, the communication module 170 may be connected to a network 162 by wireless communication or wired communication and communicate with the external device (e.g., the second external electronic device 104 or the server 106) over the network 162.

The wireless communication may be conducted using, for example, at least one of long-term evolution (LTE), LTE Advance (LTE-A), code division multiple access (CDMA), wideband CDMA (WCDMA), universal mobile telecommunication system (UMTS), wireless broadband (WiBro), or global system for mobile communications (GSM), as a cellular communication protocol. The wireless communication may include, for example, short-range communication 164. The short-range communication 164 may be conducted by, for example, at least one of wireless fidelity (WiFi), Bluetooth, near field communication (NFC), or global navigation satellite system (GNSS). GNSS may include at least one of, for example, global positioning system (GPS), global navigation satellite system (Glonass), Beidou navigation satellite system (hereinafter, referred to as "Beidou"), or Galileo, the European global satellite-based navigation system, according to a region using the GNSS or a used bandwidth. In the disclosure, the terms "GPS" and "GNSS" are interchangeably used with each other. The wired communication may be conducted in conformance to at least one of, for example, universal serial bus (USB), high definition multimedia interface (HDMI), recommended standard 232 (RS-232), or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to an embodiment, the server 106 may include a group of one or more servers. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
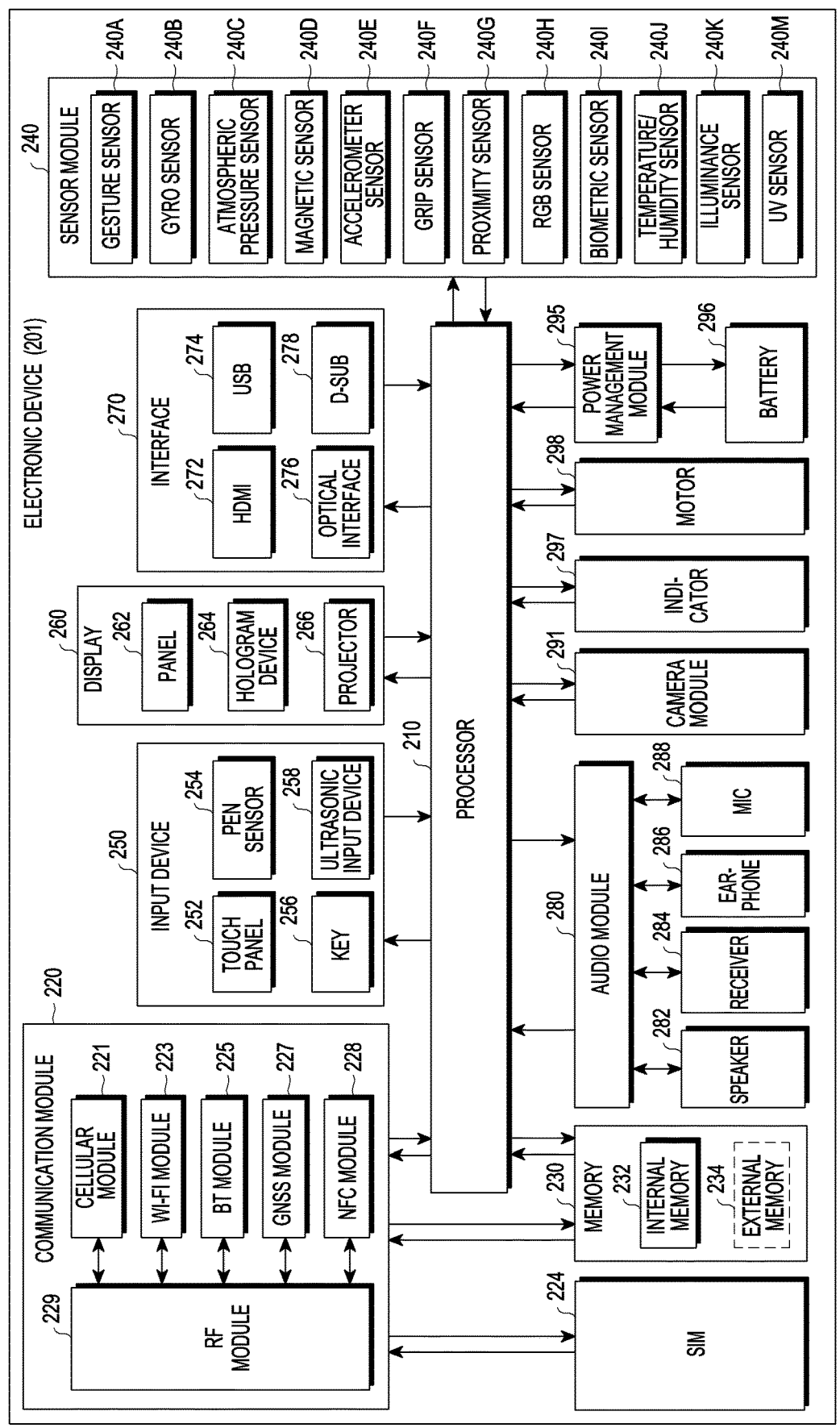
FIG. 2 is a block diagram of an electronic device according to various embodiments of the disclosure.

FIG. 2 is a block diagram of an electronic device 201 according to various embodiments. The electronic device 201 may include, for example, the whole or part of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may, for example, control a plurality of hardware or software components which are connected to the processor 210 by executing an OS or an application program, and may perform processing or computation of various types of data. The processor 210 may be implemented, for example, as a system on chip (SoC). According to an embodiment, the processor 210 may further include a graphic processing unit (GPU) and/or an image signal processor. The processor 210 may include at least a part (e.g., a cellular module 221) of the components illustrated in FIG. 2. The processor 210 may load a command or data received from at least one of other components (e.g., a non-volatile memory), process the loaded command or data, and store various types of data in the non-volatile memory.

The communication module 220 may have the same configuration as or a similar configuration to the communication module 170 illustrated in FIG. 1. The communication module 220 may include at least one of, for example, the cellular module 221, a WiFi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide services such as voice call, video call, text service, or the Internet service, for example, through a communication network. According to an embodiment, the cellular module 221 may identify and authenticate the electronic device 201 within a communication network, using the SIM (e.g., a SIM card) 224. According to an embodiment, the cellular module 221 may perform at least a part of the functionalities of the processor 210. According to an embodiment, the cellular module 221 may include a CP.

Each of the WiFi module 223, the BT module 225, the GNSS module 227, and the NFC module 228 may include, for example, a processor that may process data received or transmitted by the module. According to an embodiment, at least a part (e.g., two or more) of the cellular module 221, the WiFi module 223, the Bluetooth module 225, the GNSS module 227, or the NFC module 228 may be included in a single integrated chip (IC) or IC package.

The RF module 229 may transmit and receive, for example, communication signals (e.g., RF signals). The RF module 229 may include at least one of, for example, a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive RF signals via a separate RF module.

The SIM 224 may include, for example, a card including the SIM and/or an embedded SIM. The SIM 224 may include a unique identifier (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may be at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory, or NOR flash memory), a hard drive, or a solid state driver (SSD).

The external memory 234 may further include a flash drive such as a compact flash (CF) drive, a secure digital (SD), a micro secure digital (Micro-SD), a mini secure digital (Mini-SD), an extreme digital (xD), a multi-media card (MMC), or a memory stick. The external memory 234 may be operatively and/or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illuminance sensor 240K, or an ultra violet (UV) sensor 240M. Additionally or alternatively, the sensor module 240 may include, for example, an E-nose sensor, an electromyogram (EMG) sensor, an electroencephalogram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, a capacitive, resistive, infrared, or ultrasonic scheme. The touch panel 252 may further include a control circuit. The touch panel 252 may further include a tactile layer, to thereby provide haptic feedback to the user.

The (digital) pen sensor 254 may include, for example, a detection sheet which is a part of the touch panel or separately configured from the touch panel. The key 256 may include, for example, a physical button, an optical key, or a keypad. The ultrasonic input device 258 may sense ultrasonic signals generated by an input tool using a microphone (e.g., a microphone 288), and identify data corresponding to the sensed ultrasonic signals.

The display 260 (e.g., the display 160) may include a panel 262, a hologram device 264, or a projector 266. The panel 262 may have the same configuration as or a similar configuration to the display 160 illustrated in FIG. 1. The panel 262 may be configured to be, for example, flexible, transparent, or wearable. The panel 262 and the touch panel 252 may be implemented as a single module. The hologram device 264 may utilize the interference of light waves to provide a three-dimensional image in empty space. The projector 266 may display an image by projecting light on a screen. The screen may be positioned, for example, inside or outside the electronic device 201. According to an embodiment, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication module 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288.

The camera module 291 may capture, for example, still images and a video. According to an embodiment, the camera module 291 may include one or more image sensors (e.g., a front sensor or a rear sensor), a lens, an image signal processor (ISP), or a flash (e.g., an LED or a xenon lamp).

The power management module 295 may manage power of, for example, the electronic device 201. According to an embodiment, the power management module 295 may include a power management integrated circuit (PMIC), a charger integrated circuit, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (e.g., the processor 210), for example, boot status, message status, or charge status. The motor 298 may convert an electrical signal into a mechanical vibration, and generate vibrations or a haptic effect. While not shown, the electronic device 201 may include a processing device for supporting mobile TV (e.g., a GPU). The processing device for supporting mobile TV may process media data compliant with, for example, digital multimedia broadcasting (DMB), digital video broadcasting (DVB), or mediaFlo™.

Figure 3:
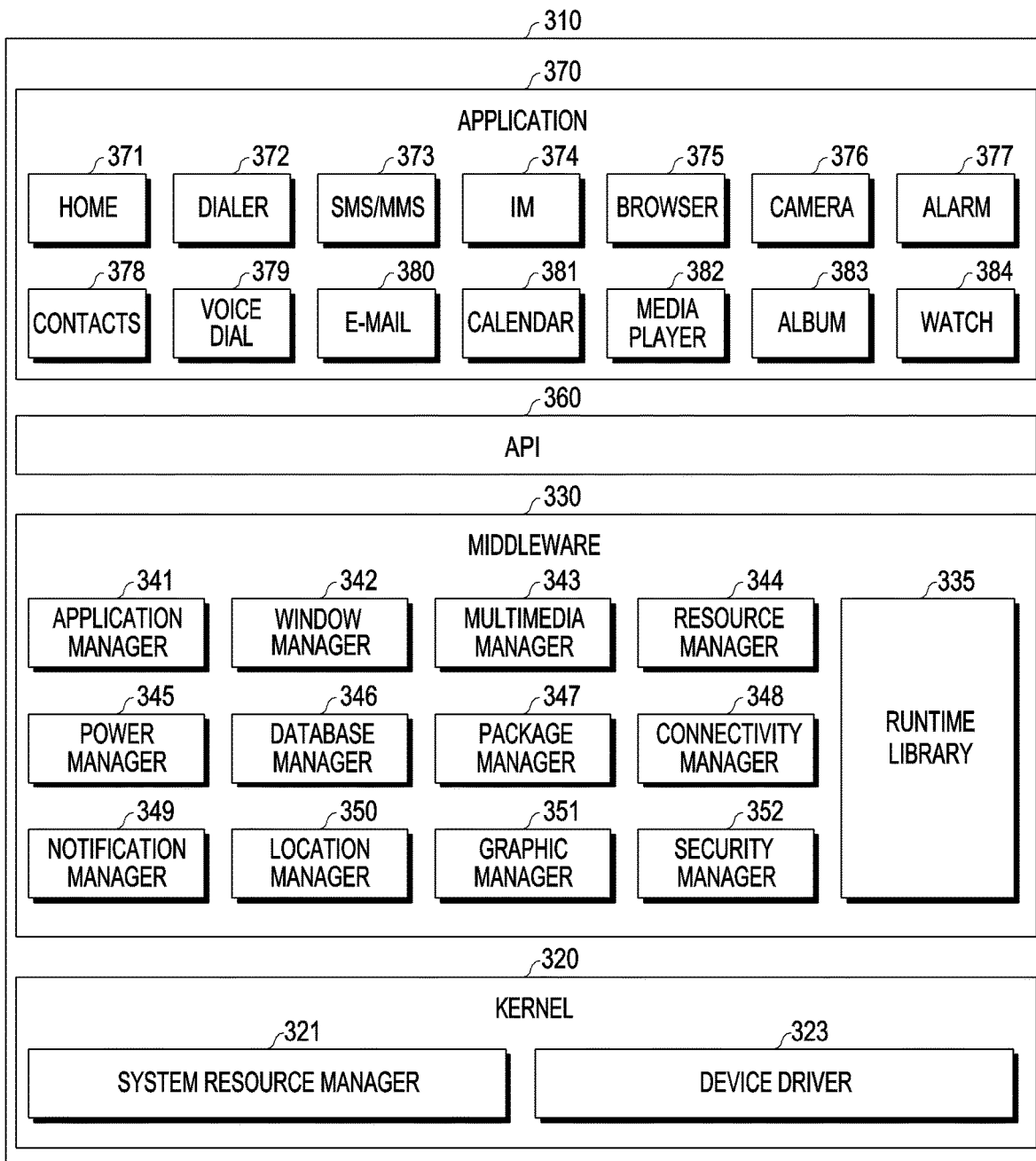
FIG. 3 is a block diagram of a programming module according to various embodiments of the disclosure.

FIG. 3 is a block diagram of a programming module according to various embodiments. According to an embodiment, a programming module 310 (e.g., the program 140) may include an OS that controls resources related to an electronic device (e.g., the electronic device 101) and/or various applications executed on the OS (e.g., the application programs 147). For example, the OS may be Android, iOS, Windows, Symbian, Tizen, Bada, or the like.

The programming module 310 may include a kernel 320, middleware 330, an application programming interface (API) 360, and/or applications 370. At least a part of the programming module 310 may be preloaded on the electronic device or downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or deallocate system resources. According to an embodiment, the system resource manager 321 may include a process manager, a memory manager, a file system manager, or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may, for example, provide a function required commonly for the applications 370 or provide various functionalities to the applications 370 through the API 360 so that the applications 370 may efficiently use limited system resources available within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like.

The application manager 341 may manage, for example, the life cycle of at least one of the applications 370. The window manager 342 may manage GUI resources used for a screen. The multimedia manager 343 may determine formats required to play back various media files, and may encode or decode a media file using a CODEC suitable for the format of the media file. The resource manager 344 may manage resources such as a source code of at least one of the applications 370, a memory, or storage space.

The power manager 345 may, for example, manage a battery or a power source by operating in conjunction with a basic input/output system (BIOS), and may provide power information required for an operation of the electronic device. The database manager 346 may generate, search, or modify a database for at least one of the applications 370. The package manager 347 may manage installation or update of an application distributed as a package file.

The connectivity manager 348 may manage, for example, wireless connectivity of WiFi, Bluetooth, or the like. The notification manager 349 may indicate or advertise an event such as message arrival, a schedule, a proximity alarm, or the like in a manner that does not bother a user. The location manager 350 may mange position information about the electronic device. The graphic manager 351 may manage graphical effects to be provided to the user or related user interfaces. The security manager 352 may provide an overall security function required for system security, user authentication, or the like. According to an embodiment, if the electronic device (e.g., the electronic device 101) has a telephony function, the middleware 330 may further include a telephony manager to manage a voice or video call function of the electronic device.

The middleware 330 may include a middleware module that combines various functions of the above-described components. The middleware 330 may provide a customized module for each OS type in order to provide differentiated functions. In addition, the middleware 330 may dynamically delete a part of the existing components or add a new component.

The API 360 (e.g., the API 145) is, for example, a set of API programming functions, which may be configured differently according to an OS. For example, in the case of Android or iOS, one API set may be provided per platform, whereas in the case of Tizen, two or more API sets may be provided per platform.

The applications 370 (e.g., the application programs 147) may include, for example, one or more applications capable of providing functions such as home 371, dialer 372, short message service/multimedia messaging service (SMS/MMS) 373, Instant message (IM) 374, browser 375, camera 376, alarm 377, contacts 378, voice dial 379, email 380, calendar 381, media player 382, album 383, or clock 384, health care (e.g., measurement of an exercise amount or a glucose level), or providing of environment information (e.g., information about atmospheric pressure, humidity, or temperature).

According to an embodiment, the applications 370 may include an application (for the convenience of description, referred to as "information exchange application") supporting information exchange between the electronic device (e.g., the electronic device 101) and an external electronic device (the electronic device 102 or 104). The information exchange application may include, for example, a notification relay application for transmitting specific information to the external electronic device or a device management application for managing the external electronic device.

For example, the notification relay application may include a function of transmitting notification information generated from another application (e.g., an SMS/MMS application, an email application, a health care application, or an environment information application) to the external electronic device (e.g., the electronic device 102 or 104). Also, the notification relay application may, for example, receive notification information from the external electronic device and transmit the received notification information to a user.

The device management application may, for example, manage (e.g., install, delete, or update) at least a part of functions of the external electronic device (e.g., the electronic device 102 or 104) communicating with the electronic device (e.g., turn-on/turn-off of the external electronic device (or a part of its components) or control of the brightness (or resolution) of the display), an application executed in the external electronic device, or a service (e.g., a call service or a message service) provided by the external electronic device.

According to an embodiment, the applications 370 may include an application (e.g., a health care application of a mobile medical equipment) designated according to a property of the external electronic device (e.g., the electronic device 102 or 104). According to an embodiment, the applications 370 may include an application received from an external electronic device (e.g., the server 106 or the electronic device 102 or 104). According to an embodiment, the applications 370 may include a preloaded application or a third party application downloadable from a server. The names of components of the programming module 310 according to the illustrated embodiment may vary according to the type of an OS.

According to various embodiments, at least a part of the programming module 310 may be implemented in software, firmware, hardware, or a combination of at least two of them. At least a part of the programming module 310 may be implemented (e.g., executed) by the processor (e.g., the processor 210). At least a part of the programming module 310 may include, for example, a module, a program, a routine, a set of instructions, or a process to execute one or more functions.

Each of the above-described components of the electronic device may include one or more parts, and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

The term "module" as used herein may include its ordinary meaning including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate arrays (FPGAs), or programmable logic devices that perform certain operations.

At least a part of apparatuses (e.g., modules or their functions) or methods (e.g., operations) according to various embodiments may be implemented as commands stored in a computer-readable storage medium, in the form of a programming module. When the commands are executed by a processor (for example, the processor 120), one or more processors may execute functions corresponding to the commands. The computer-readable storage medium may be, for example, the memory 130.

The computer-readable medium may include hard disk, floppy disk, magnetic media (e.g., magnetic tape), optical media (e.g., compact disc read-only memory (CD-ROM)), digital versatile disc (DVD), magneto-optical media (for example, floptical disk), hardware devices (for example, read only memory (ROM), random access memory (RAM) or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

Figure 4:
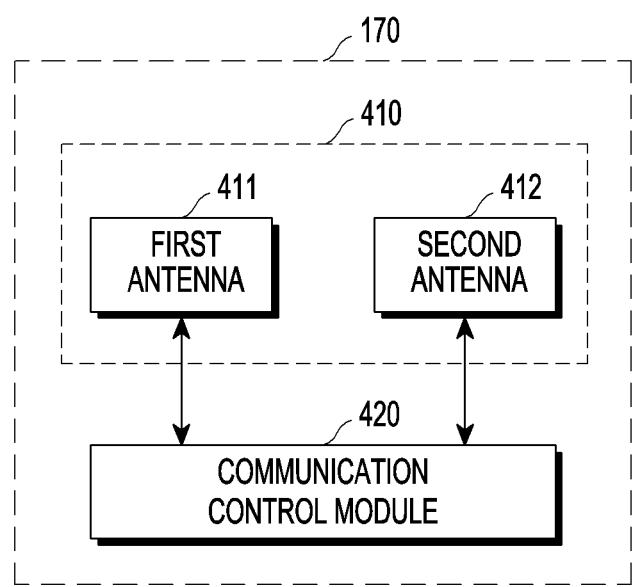
FIG. 4 is a block diagram of a communication module according to various embodiments of the disclosure.

FIG. 4 is a block diagram of a communication module according to various embodiments of the disclosure.

The communication module 170 may include an antenna 410 and a communication control module 420.

The antenna 410 may transmit and receive at least one communication signal.

The antenna 410 may include a plurality of antennas, for example, a first antenna 411 and a second antenna 412.

The antenna 410 may be incorporated in the communication module 170 or configured separately from the communication module 170.

The communication control module 420 may generate at least one communication signal and transmit the generated communication signal through the antenna 410. The communication control module 420 may receive at least one communication signal through the antenna 410.

The communication control module 420 may conduct wireless communication in at least one communication scheme. For example, the communication control module 420 may comply with, as a cellular communication protocol, at least one of, for example, long-term evolution (LTE), LTE Advance (LTE-A), code division multiple access (CDMA), wideband CDMA (WCDMA), universal mobile telecommunication system (UMTS), wireless broadband (WiBro), or global system for mobile communications (GSM). Further, the communication control module 420 may comply with, as a short-range communication protocol, at least one of, for example, wireless fidelity (WiFi), Bluetooth, near field communication (NFC), Zigbee, or global navigation satellite system (GNSS).

The communication control module 420 may include at least one of the afore-described cellular module 221, WiFi module 223, Bluetooth module 225, GNSS module 227 (e.g., GPS module, Glonass module, Beidou module, or Galileo module), NFC module 228, radio frequency (RF) module 229, or Zigbee module (not shown).

According to an embodiment, the communication control module 420 may conduct simultaneous communication in a plurality of communication schemes. For example, the communication control module 420 may conduct simultaneous communication in a plurality of communication schemes having the same band or specific bands.

The communication control module 420 may communicate through a plurality of antennas 410. For example, the communication control module 420 may communicate in one communication scheme through the plurality of antennas 410, or in a different communication scheme for each of the plurality of antennas 410.

According to an embodiment, the communication control module 420 may communicate in a first communication scheme through the first antenna 411 and in a second communication scheme through the second antenna 412, among the plurality of antennas 410.

The communication control module 420 may change at least one communication scheme for each of the plurality of antennas 410 every predetermined time period or every predetermined communication period. The predetermined time period or communication period may mean the same. The predetermined time period may refer to a predetermined time duration, and the predetermined communication period may refer to a predetermined interval meaning a predetermined period.

Figure 5:
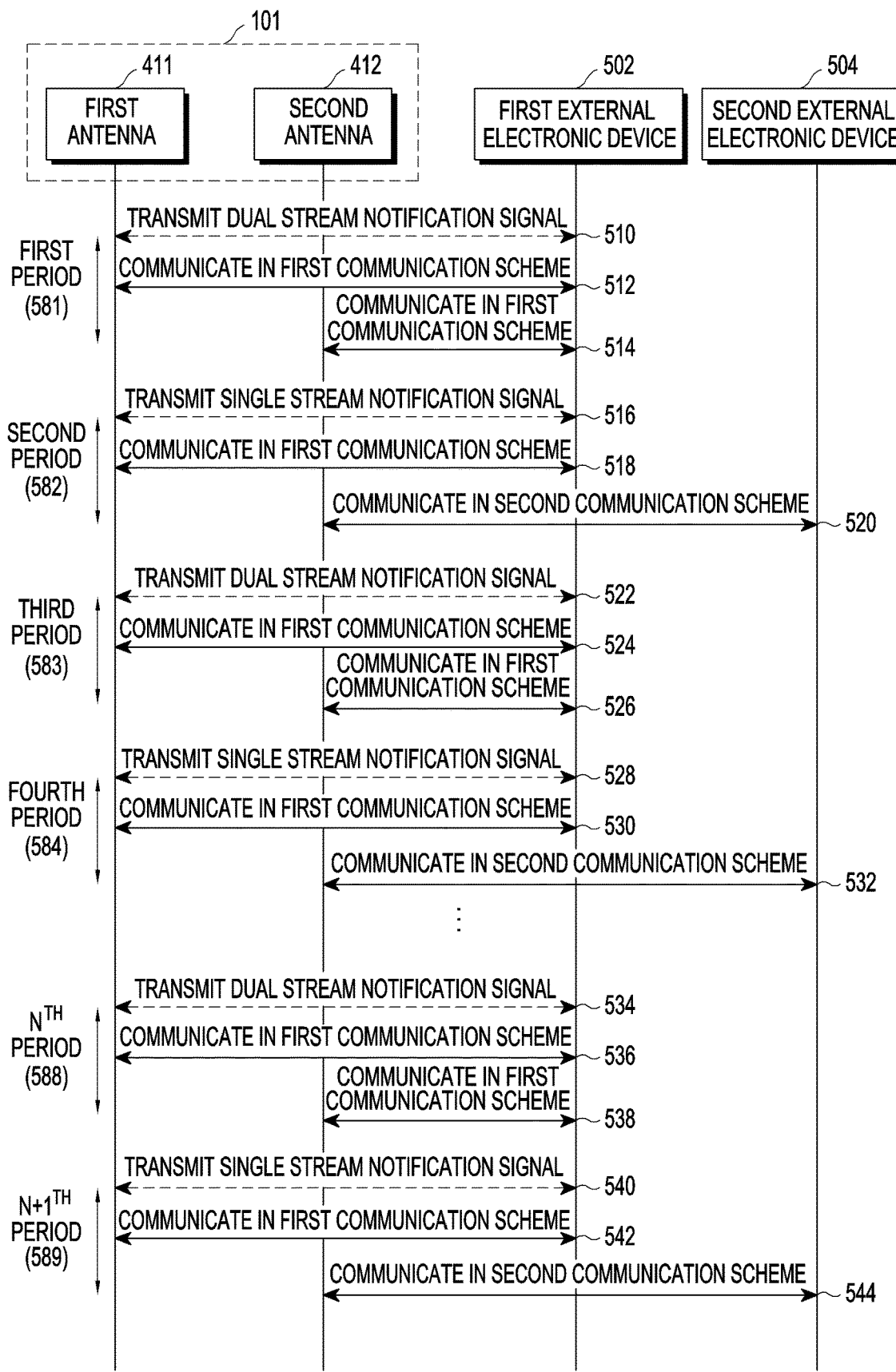
FIG. 5 is a flowchart illustrating a method for operating an electronic device according to various embodiments of the disclosure.

FIG. 5 is a flowchart illustrating a method for operating an electronic device according to various embodiments of the disclosure.

In operation 510, the electronic device 101, for example, the communication control module 420 may transmit a dual stream notification signal to a first external electronic device 502 through the first antenna 411. The dual stream notification signal may be a signal indicating communication through a plurality of antennas, for example, the first antenna 411 and the second antenna 412. The electronic device 101, for example, the communication control module 420 may receive a response signal to the transmitted dual stream notification signal from the first external electronic device 502. The transmission of the dual stream notification signal from the electronic device 101 in operation 510 may be performed during or before a first period 581.

In operation 512, the electronic device 101, for example, the communication control module 420 may communicate with the first external electronic device 502 through the first antenna 411 in a first communication scheme. In operation 514, the electronic device 101, for example, the communication control module 420 may communicate with the first external electronic device 502 through the second antenna 412 in the first communication scheme. Operations 512 and 514 may be included in the first period 581. Accordingly, the electronic device 101, for example, the communication control module 420 may communicate with the first external electronic device 502 through the first and second antennas 411 and 412 in the first communication scheme during the first period 581. The first communication scheme may be a communication scheme for which a plurality of antennas may be used. For example, the first communication scheme may be a communication scheme for which a single antenna or dual antennas may be used.

In operation 516, the electronic device 101, for example, the communication control module 420 may transmit a single stream notification signal to the first external electronic device 502 through the first antenna 411. The single stream notification signal may be a signal indicating communication through one antenna, for example, the first antenna 411. The electronic device 101, for example, the communication control module 420 may receive a response signal to the transmitted single stream notification signal from the first external electronic device 502. The transmission of the single stream notification signal from the electronic device 101 in operation 516 may be performed during or before a second period 582.

In operation 518, the electronic device 101, for example, the communication control module 420 may communicate with the first external electronic device 502 through the first antenna 411 in the first communication scheme. In operation 520, the electronic device 101, for example, the communication control module 420 may communicate with a second external electronic device 504 through the second antenna 412 in the second communication scheme. Operations 518 and 520 may be included in the second period 582. Accordingly, the electronic device 101, for example, the communication control module 420 may communicate, during the second period 582, with the first external electronic device 502 through the first antenna 411 in the first communication scheme, and with the second external electronic device 504 through the second antenna 412 in the second communication scheme.

In operation 522, the electronic device 101, for example, the communication control module 420 may transmit a dual stream notification signal to the first external electronic device 502 through the first antenna 411. The electronic device 101, for example, the communication control module 420 may receive a response signal to the transmitted dual stream notification signal from the first external electronic device 502. The transmission of the dual stream notification signal from the electronic device 101 in operation 522 may be performed during or before a third period 583.

In operation 524, the electronic device 101, for example, the communication control module 420 may communicate with the first external electronic device 502 through the first antenna 411 in the first communication scheme. In operation 526, the electronic device 101, for example, the communication control module 420 may communicate with the first external electronic device 502 through the second antenna 412 in the first communication scheme. Operations 524 and 526 may be included in the third period 583. Accordingly, the electronic device 101, for example, the communication control module 420 may communicate with the first external electronic device 502 through the first and second antennas 411 and 412 in the first communication scheme during the third period 583.

In operation 528, the electronic device 101, for example, the communication control module 420 may transmit a single stream notification signal to the first external electronic device 502 through the first antenna 411. The electronic device 101, for example, the communication control module 420 may receive a response signal to the transmitted single stream notification signal from the first external electronic device 502. The transmission of the single stream notification signal from the electronic device 101 in operation 528 may be performed during or before a fourth period 584.

In operation 530, the electronic device 101, for example, the communication control module 420 may communicate with the first external electronic device 502 through the first antenna 411 in the first communication scheme. In operation 532, the electronic device 101, for example, the communication control module 420 may communicate with the second external electronic device 504 through the second antenna 412 in the second communication scheme. Operations 530 and 532 may be included in the fourth period 584. Accordingly, the electronic device 101, for example, the communication control module 420 may communicate, during the fourth period 584, with the first external electronic device 502 through the first antenna 411 in the first communication scheme, and with the second external electronic device 504 through the second antenna 412 in the second communication scheme.

The electronic device 101, for example, the communication control module 420 may repeat the above-described procedure. Therefore, the electronic device 101, for example, the communication control module 420 may also repeat the above-described procedure during an $n^{th}$ period 588 and an $(n+1)^{th}$ period 589.

In operation 534, the electronic device 101, for example, the communication control module 420 may transmit a dual stream notification signal to the first external electronic device 502 through the first antenna 411. The electronic device 101, for example, the communication control module 420 may receive a response signal to the transmitted dual stream notification signal from the first external electronic device 502. The transmission of the dual stream notification signal from the electronic device 101 in operation 534 may be performed during or before the $n^{th}$ period 588.

In operation 536, the electronic device 101, for example, the communication control module 420 may communicate with the first external electronic device 502 through the first antenna 411 in the first communication scheme. In operation 538, the electronic device 101, for example, the communication control module 420 may communicate with the first external electronic device 502 through the second antenna 412 in the first communication scheme. Operations 536 and 538 may be included in the $n^{th}$ period 588. Accordingly, the electronic device 101, for example, the communication control module 420 may communicate with the first external electronic device 502 through the first and second antennas 411 and 412 in the first communication scheme during the $n^{th}$ period 588.

In operation 540, the electronic device 101, for example, the communication control module 420 may transmit a single stream notification signal to the first external electronic device 502 through the first antenna 411. The electronic device 101, for example, the communication control module 420 may receive a response signal to the transmitted single stream notification signal from the first external electronic device 502. The transmission of the single stream notification signal from the electronic device 101 in operation 540 may be performed during or before the $(n+1)^{th}$ period 589.

In operation 542, the electronic device 101, for example, the communication control module 420 may communicate with the first external electronic device 502 through the first antenna 411 in the first communication scheme. In operation 544, the electronic device 101, for example, the communication control module 420 may communicate with the second external electronic device 504 through the second antenna 412 in the second communication scheme. Operations 542 and 544 may be included in the $(n+1)^{th}$ period 589. Accordingly, the electronic device 101, for example, the communication control module 420 may communicate, during the $(n+1)^{th}$ period 589, with the first external electronic device 502 through the first antenna 411 in the first communication scheme, and with the second external electronic device 504 through the second antenna 412 in the second communication scheme.

Figure 6:
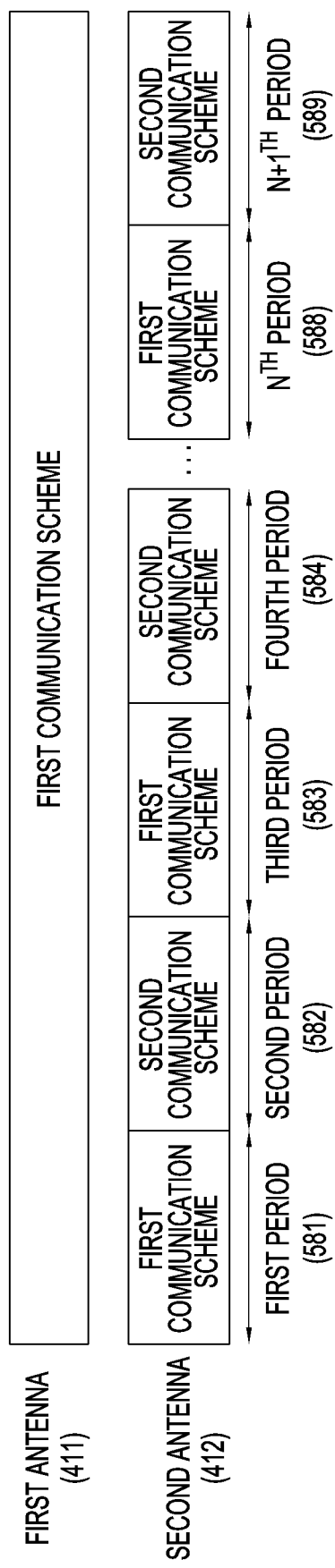
FIG. 6 is a conceptual view illustrating communication through a plurality of antennas according to various embodiments of the disclosure.

FIG. 6 is a conceptual view illustrating communication through a plurality of antennas according to various embodiments of the disclosure.

Referring to FIG. 6, the electronic device 101, for example, the communication control module 420 may communicate through the first antenna 411 in the first communication scheme during the first to $(n+1)^{th}$ periods 581 to 589, and through the second antenna 412 in the first communication scheme during the first period 581, the third period 583, and the $n^{th}$ period 588.

The electronic device 101, for example, the communication control module 420 may communicate through the second antenna 412 in the second communication scheme during the second period 582, the fourth period 584, and the $n+1^{th}$ period 589.

Therefore, the electronic device 101, for example, the communication control module 420 may communicate through the first and second antennas 411 and 412 in the first communication scheme during the first period 581, the third period 583, and the $n^{th}$ period 588. The electronic device 101, for example, the communication control module 420 may communicate through the first antenna 411 in the first communication scheme and through the second antenna 412 in the second communication scheme, during the second period 582, the fourth period 584, and the $(n+1)^{th}$ period 589.

An embodiment of the foregoing operation method according to various embodiments of the disclosure will be described.

Figure 7:
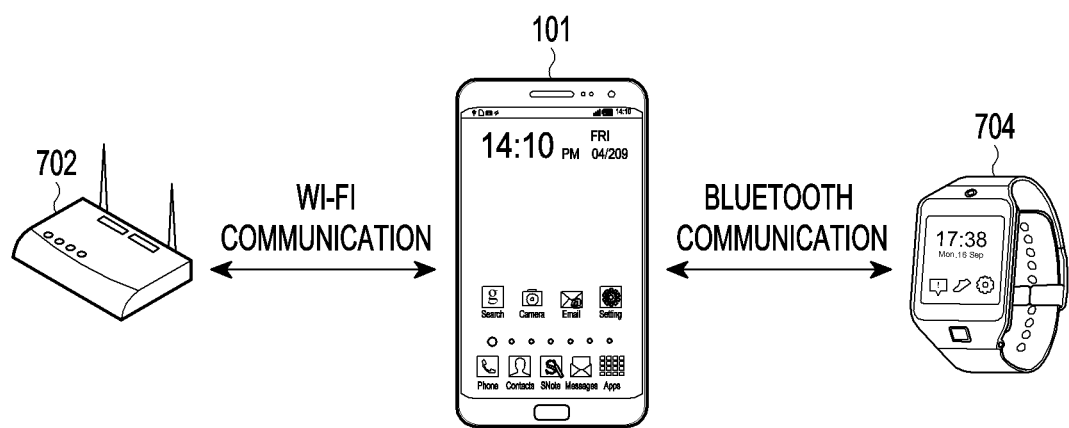
FIG. 7 is an exemplary view illustrating a communication method of an electronic device according to various embodiments of the disclosure.

FIG. 7 is an exemplary view illustrating a communication method of an electronic device according to various embodiments of the disclosure.

The electronic device 101 may simultaneously communicate with a plurality of external electronic devices which are an access point (AP) 702 and a Bluetooth device 704. The electronic device 101, for example, the communication module 170 may communicate with the AP 702 by WiFi, and with the Bluetooth device 704 by Bluetooth.

Figure 8:
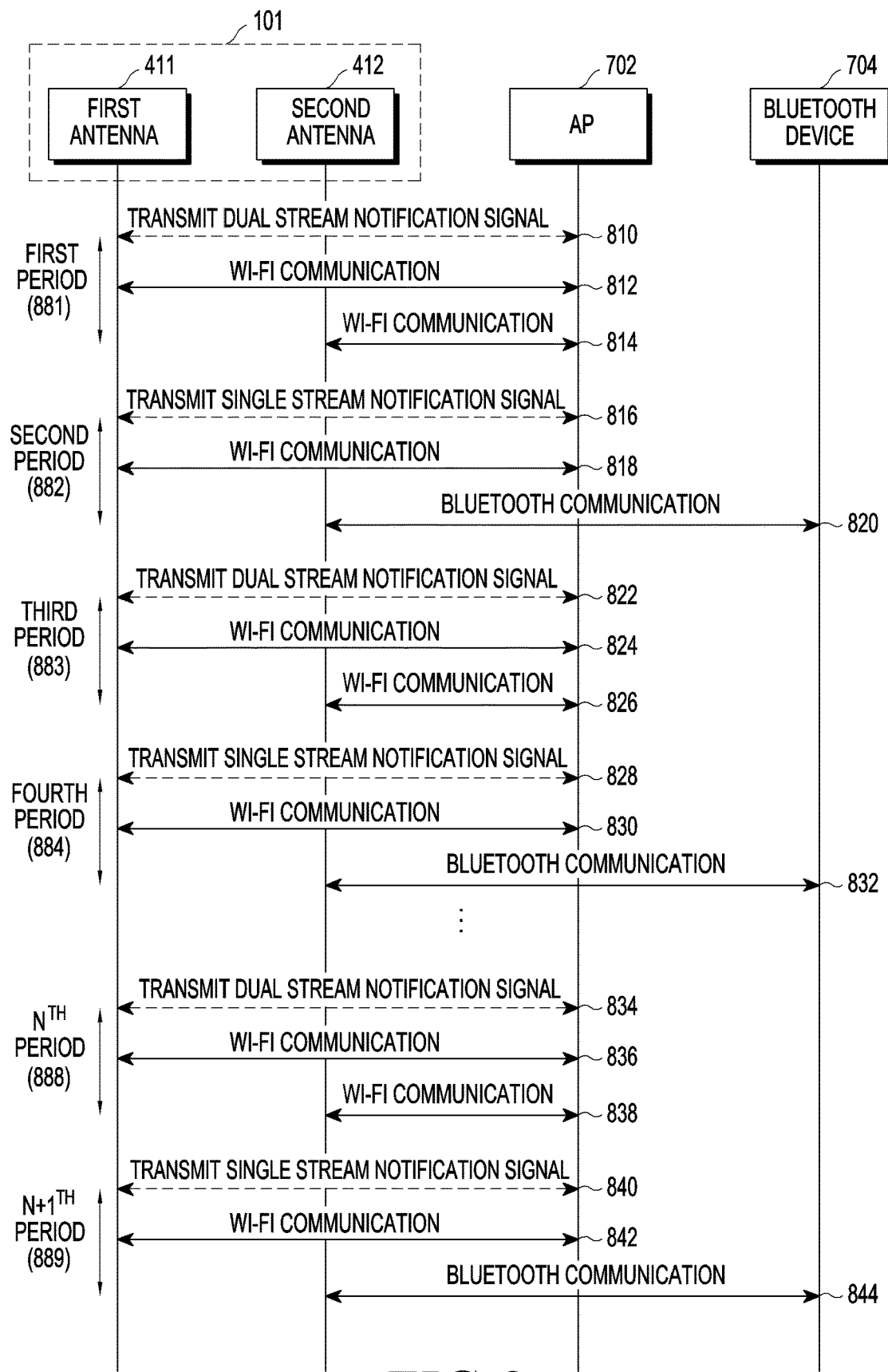
FIG. 8 is a flowchart illustrating a method for operating an electronic device according to various embodiments of the disclosure.

FIG. 8 is a flowchart illustrating a method for operating an electronic device according to various embodiments of the disclosure.

In operation 810, the electronic device 101, for example, the communication control module 420 may transmit a dual stream notification signal to the AP 702 through the first antenna 411. The dual stream notification signal may be a signal indicating communication through a plurality of antennas, for example, the first antenna 411 and the second antenna 412. The electronic device 101, for example, the communication control module 420 may receive a response signal to the transmitted dual stream notification signal from the AP 702. The transmission of the dual stream notification signal from the electronic device 101 in operation 810 may be performed during or before a first period 881.

In operation 812, the electronic device 101, for example, the communication control module 420 may communicate with the AP 702 through the first antenna 411 in a WiFi communication scheme. In operation 814, the electronic device 101, for example, the communication control module 420 may communicate with the AP 702 through the second antenna 412 in the WiFi communication scheme. Operations 812 and 814 may be included in the first period 881. Accordingly, the electronic device 101, for example, the communication control module 420 may communicate with the AP 702 through the first and second antennas 411 and 412 in the WiFi communication scheme during the first period 881.

In operation 816, the electronic device 101, for example, the communication control module 420 may transmit a single stream notification signal to the AP 702 through the first antenna 411. The single stream notification signal may be a signal indicating communication through one antenna, for example, the first antenna 411. The electronic device 101, for example, the communication control module 420 may receive a response signal to the transmitted single stream notification signal from the AP 702. The transmission of the single stream notification signal from the electronic device 101 in operation 816 may be performed during or before a second period 882.

In operation 818, the electronic device 101, for example, the communication control module 420 may communicate with the AP 702 through the first antenna 411 in the WiFi communication scheme. In operation 820, the electronic device 101, for example, the communication control module 420 may communicate with the Bluetooth device 704 through the second antenna 412 in a Bluetooth communication scheme. Operations 818 and 820 may be included in the second period 882. Accordingly, the electronic device 101, for example, the communication control module 420 may communicate, during the second period 882, with the AP 702 through the first antenna 411 in the WiFi communication scheme, and with the Bluetooth device 704 through the second antenna 412 in the Bluetooth communication scheme.

In operation 822, the electronic device 101, for example, the communication control module 420 may transmit a dual stream notification signal to the AP 702 through the first antenna 411. The electronic device 101, for example, the communication control module 420 may receive a response signal to the transmitted dual stream notification signal from the AP 702. The transmission of the dual stream notification signal from the electronic device 101 in operation 822 may be performed during or before a third period 883.

In operation 824, the electronic device 101, for example, the communication control module 420 may communicate with the AP 702 through the first antenna 411 in the WiFi communication scheme. In operation 826, the electronic device 101, for example, the communication control module 420 may communicate with the AP 702 through the second antenna 412 in the WiFi communication scheme. Operations 824 and 826 may be included in the third period 883. Accordingly, the electronic device 101, for example, the communication control module 420 may communicate with the AP 702 through the first and second antennas 411 and 412 in the WiFi communication scheme during the third period 883.

In operation 828, the electronic device 101, for example, the communication control module 420 may transmit a single stream notification signal to the AP 702 through the first antenna 411. The electronic device 101, for example, the communication control module 420 may receive a response signal to the transmitted single stream notification signal from the AP 702. The transmission of the single stream notification signal from the electronic device 101 in operation 828 may be performed during or before a fourth period 884.

In operation 830, the electronic device 101, for example, the communication control module 420 may communicate with the AP 702 through the first antenna 411 in the WiFi communication scheme. In operation 832, the electronic device 101, for example, the communication control module 420 may communicate with the Bluetooth device 704 through the second antenna 412 in the Bluetooth communication scheme. Operations 830 and 832 may be included in the fourth period 884. Accordingly, the electronic device 101, for example, the communication control module 420 may communicate, during the fourth period 884, with the AP 702 through the first antenna 411 in the WiFi communication scheme, and with the Bluetooth device 704 through the second antenna 412 in the Bluetooth communication scheme.

The electronic device 101, for example, the communication control module 420 may repeat the above-described procedure. Therefore, electronic device 101, for example, the communication control module 420 may also repeat the above-described procedure during an $n^{th}$ period 888 and an $(n+1)^{th}$ period 889.

In operation 834, the electronic device 101, for example, the communication control module 420 may transmit a dual stream notification signal to the AP 702 through the first antenna 411. The electronic device 101, for example, the communication control module 420 may receive a response signal to the transmitted dual stream notification signal from the AP 702. The transmission of the dual stream notification signal from the electronic device 101 in operation 834 may be performed during or before the $n^{th}$ period 888.

In operation 836, the electronic device 101, for example, the communication control module 420 may communicate with the AP 702 through the first antenna 411 in the WiFi communication scheme. In operation 838, the electronic device 101, for example, the communication control module 420 may communicate with the AP 702 through the second antenna 412 in the WiFi communication scheme. Operations 836 and 838 may be included in the $n^{th}$ period 888. Accordingly, the electronic device 101, for example, the communication control module 420 may communicate with the AP 702 through the first and second antennas 411 and 412 in the WiFi communication scheme during the $n^{th}$ period 888.

In operation 840, the electronic device 101, for example, the communication control module 420 may transmit a single stream notification signal to the AP 702 through the first antenna 411. The electronic device 101, for example, the communication control module 420 may receive a response signal to the transmitted single stream notification signal from the AP 702. The transmission of the single stream notification signal from the electronic device 101 in operation 840 may be performed during or before the $(n+1)^{th}$ period 889.

In operation 842, the electronic device 101, for example, the communication control module 420 may communicate with the AP 702 through the first antenna 411 in the WiFi communication scheme. In operation 844, the electronic device 101, for example, the communication control module 420 may communicate with the Bluetooth device 704 through the second antenna 412 in the Bluetooth communication scheme. Operations 842 and 844 may be included in the $(n+1)^{th}$ period 889. Accordingly, the electronic device 101, for example, the communication control module 420 may communicate, during the $(n+1)^{th}$ period 889, with the AP 702 through the first antenna 411 in the WiFi communication scheme, and with the Bluetooth device 704 through the second antenna 412 in the Bluetooth communication scheme.

Figure 9:
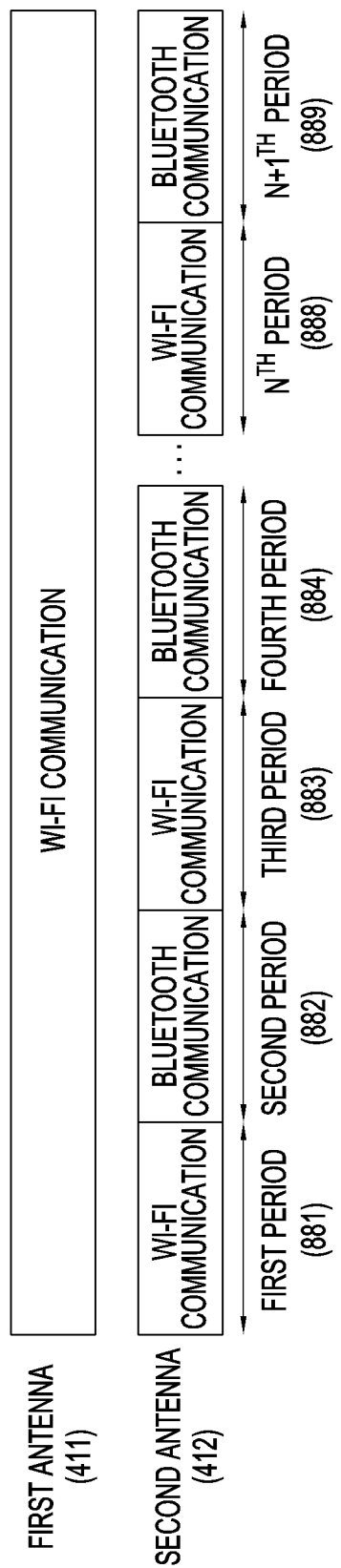
FIG. 9 is a conceptual view illustrating communication through a plurality of antennas according to various embodiments of the disclosure.

FIG. 9 is a conceptual view illustrating communication through a plurality of antennas according to various embodiments of the disclosure.

Referring to FIG. 9, the electronic device 101, for example, the communication control module 420 may communicate through the first antenna 411 in the WiFi communication scheme during the first to $(n+1)^{th}$ periods 881 to 889, and through the second antenna 412 in the WiFi communication scheme during the first period 881, the third period 883, and the $n^{th}$ period 888.

The electronic device 101, for example, the communication control module 420 may communicate through the second antenna 412 in the Bluetooth communication scheme during the second period 882, the fourth period 884, and the $n+1^{th}$ period 889.

Therefore, the electronic device 101, for example, the communication control module 420 may communicate through the first and second antennas 411 and 412 in the WiFi communication scheme during the first period 881, the third period 883, and the $n^{th}$ period 888. The electronic device 101, for example, the communication control module 420 may communicate through the first antenna 411 in the WiFi communication scheme and through the second antenna 412 in the Bluetooth communication scheme, during the second period 882, the fourth period 884, and the $(n+1)^{th}$ period 889.

The electronic device 101 according to various embodiments may transmit transmission scheduling information for a communication operation in at least one communication scheme using a plurality of antennas, and communicate through the plurality of antennas in correspondence with the transmitted scheduling information.

Figure 10:
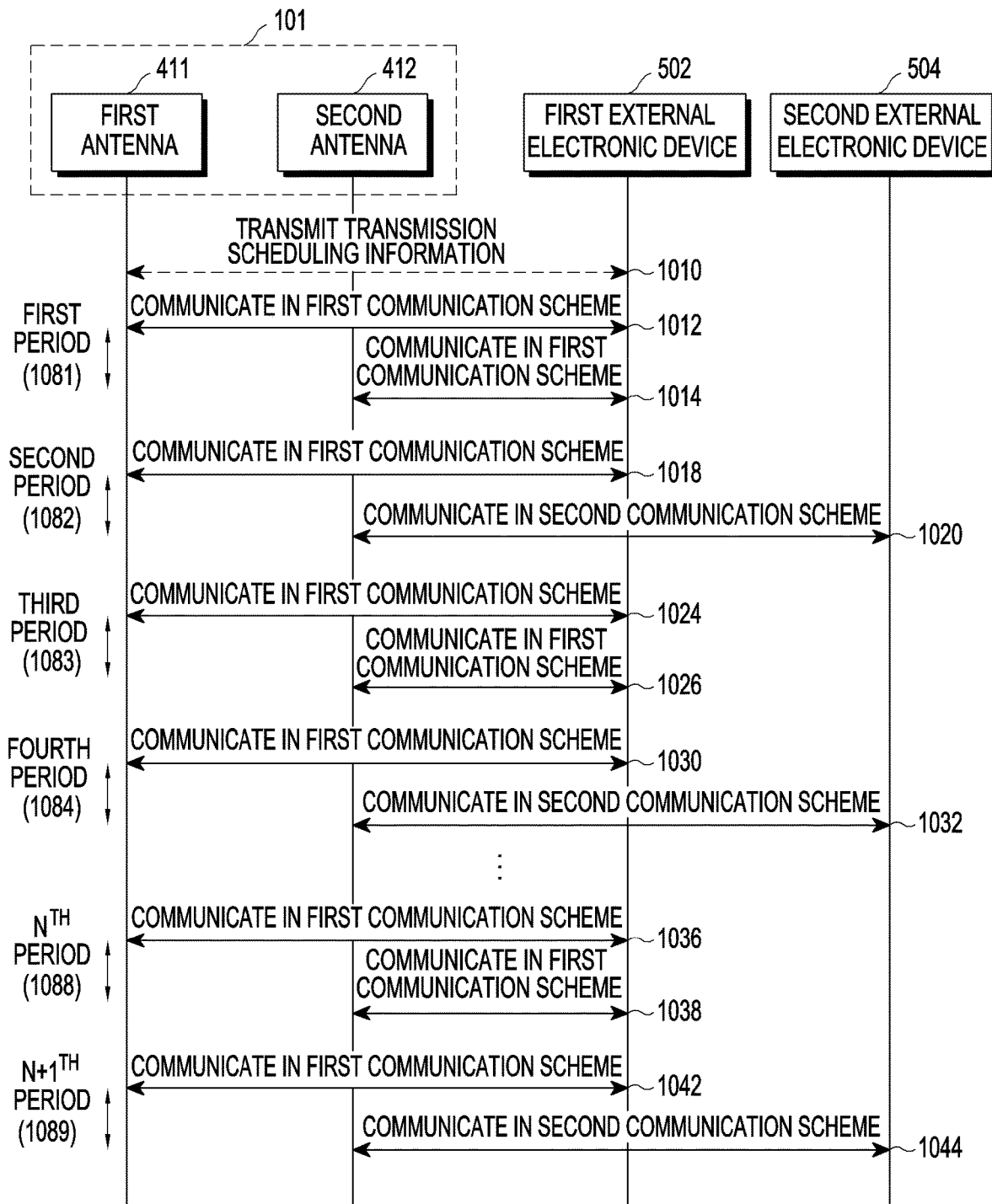
FIG. 10 is a flowchart illustrating a method for operating an electronic device according to various embodiments of the disclosure.

FIG. 10 is a flowchart illustrating a method for operating an electronic device according to various embodiments of the disclosure.

In operation 1010, the electronic device 101, for example, the communication control module 420 may transmit transmission scheduling information to the first external electronic device 502 through the first antenna 411. The transmission scheduling information may include information about a communication scheme in which each of a plurality of antennas being the first and second antennas 411 and 412 communicates during at least one period. For example, the transmission scheduling information may include information about at least one period during which at least one of the first and second antennas 411 and 412 communicates with the first external electronic device 502 in the first communication scheme. The electronic device 101, for example, the communication control module 420 may receive a response signal to the transmitted transmission scheduling information from the first external electronic device 502. The transmission of the transmission scheduling information from the electronic device 101 in operation 1010 may be performed during or before a first period 1081.

In operation 1012, the electronic device 101, for example, the communication control module 420 may communicate with the first external electronic device 502 through the first antenna 411 in the first communication scheme. In operation 1014, the electronic device 101, for example, the communication control module 420 may communicate with the first external electronic device 502 through the second antenna 412 in the first communication scheme. Operations 1012 and 1014 may be included in the first period 1081. Accordingly, the electronic device 101, for example, the communication control module 420 may communicate with the first external electronic device 502 through the first and second antennas 411 and 412 in the first communication scheme during the first period 1081. The first communication scheme may be a communication scheme for which a plurality of antennas may be used. For example, the first communication scheme may be a communication scheme for which a single antenna or dual antennas may be used.

In operation 1018, the electronic device 101, for example, the communication control module 420 may communicate with the first external electronic device 502 through the first antenna 411 in the first communication scheme. In operation 1020, the electronic device 101, for example, the communication control module 420 may communicate with the second external electronic device 504 through the second antenna 412 in the second communication scheme. Operations 1018 and 1020 may be included in a second period 1082. Accordingly, the electronic device 101, for example, the communication control module 420 may communicate, during the second period 1082, with the first external electronic device 502 through the first antenna 411 in the first communication scheme, and with the second external electronic device 504 through the second antenna 412 in the second communication scheme.

In operation 1024, the electronic device 101, for example, the communication control module 420 may communicate with the first external electronic device 502 through the first antenna 411 in the first communication scheme. In operation 1026, the electronic device 101, for example, the communication control module 420 may communicate with the first external electronic device 502 through the second antenna 412 in the first communication scheme. Operations 1024 and 1026 may be included in a third period 1083. Accordingly, the electronic device 101, for example, the communication control module 420 may communicate with the first external electronic device 502 through the first and second antennas 411 and 412 in the first communication scheme during the third period 1083.

In operation 1030, the electronic device 101, for example, the communication control module 420 may communicate with the first external electronic device 502 through the first antenna 411 in the first communication scheme. In operation 1032, the electronic device 101, for example, the communication control module 420 may communicate with the second external electronic device 504 through the second antenna 412 in the second communication scheme. Operations 1030 and 1032 may be included in a fourth period 1084. Accordingly, the electronic device 101, for example, the communication control module 420 may communicate, during the fourth period 1084, with the first external electronic device 502 through the first antenna 411 in the first communication scheme, and with the second external electronic device 504 through the second antenna 412 in the second communication scheme.

The electronic device 101, for example, the communication control module 420 may repeat the above-described procedure. Therefore, electronic device 101, for example, the communication control module 420 may also repeat the above-described procedure during an $n^{th}$ period 1088 and an $(n+1)^{th}$ period 1089.

In operation 1036, the electronic device 101, for example, the communication control module 420 may communicate with the first external electronic device 502 through the first antenna 411 in the first communication scheme. In operation 1038, the electronic device 101, for example, the communication control module 420 may communicate with the first external electronic device 502 through the second antenna 412 in the first communication scheme. Operations 1036 and 1038 may be included in the $n^{th}$ period 1088. Accordingly, the electronic device 101, for example, the communication control module 420 may communicate with the first external electronic device 502 through the first and second antennas 411 and 412 in the first communication scheme during the $n^{th}$ period 1088.

In operation 1042, the electronic device 101, for example, the communication control module 420 may communicate with the first external electronic device 502 through the first antenna 411 in the first communication scheme. In operation 1044, the electronic device 101, for example, the communication control module 420 may communicate with the second external electronic device 504 through the second antenna 412 in the second communication scheme. Operations 1042 and 1044 may be included in the $(n+1)^{th}$ period 1089. Accordingly, the electronic device 101, for example, the communication control module 420 may communicate, during the $(n+1)^{th}$ period 1089, with the first external electronic device 502 through the first antenna 411 in the first communication scheme, and with the second external electronic device 504 through the second antenna 412 in the second communication scheme.

As described above, the electronic device according to various embodiments of the disclosure may transmit transmission scheduling information for a communication operation in a plurality of communication schemes using each of a plurality of antennas, and communicate through each of the plurality of antennas in correspondence with the transmitted scheduling information.

Figure 11:
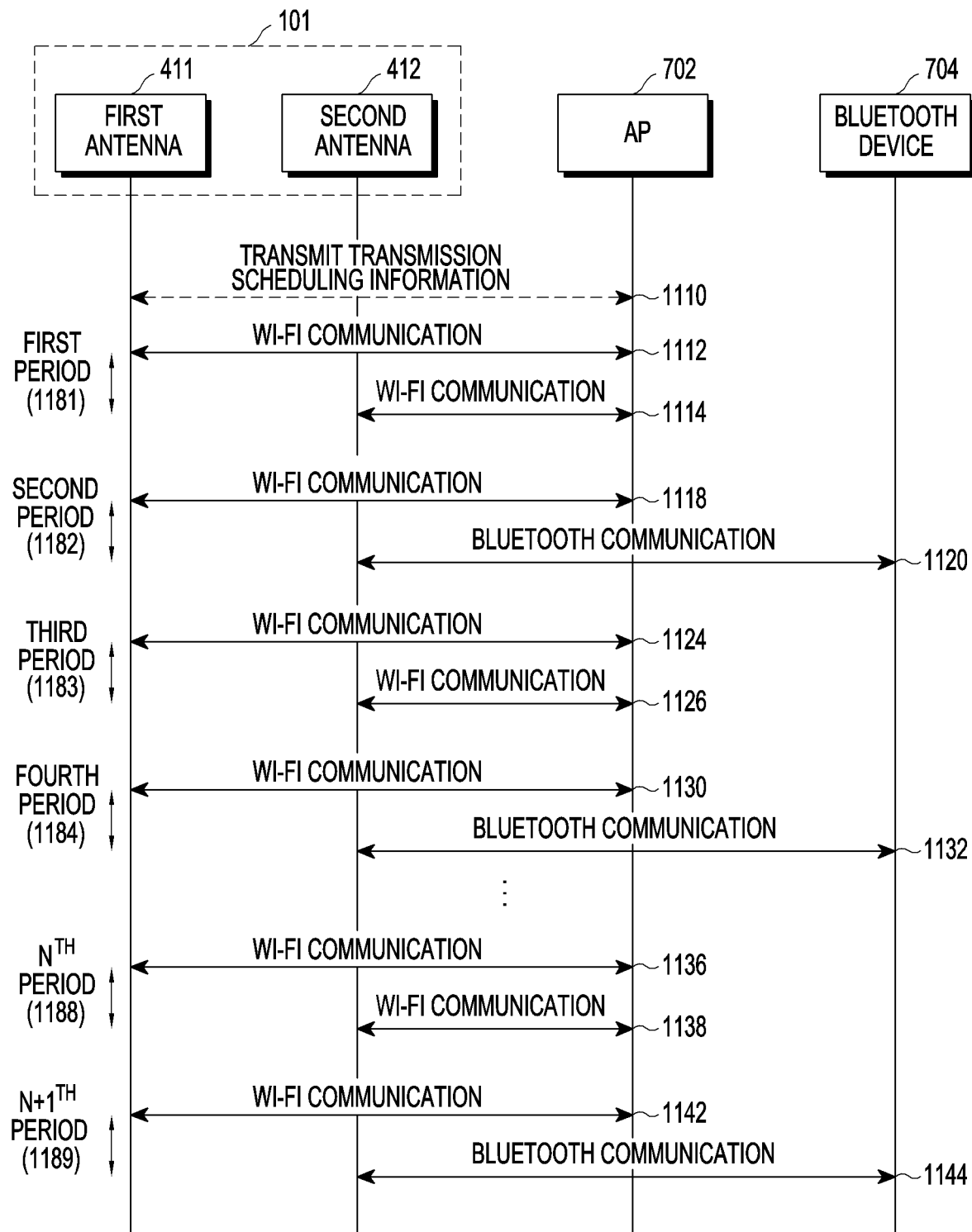
FIG. 11 is a flowchart illustrating a method for operating an electronic device according to various embodiments of the disclosure.

With reference to FIG. 11, a specific embodiment of an operation method using transmission scheduling information according to various embodiments of the disclosure will be described.

FIG. 11 is a flowchart illustrating a method for operating an electronic device according to various embodiments of the disclosure.

In operation 1110, the electronic device 101, for example, the communication control module 420 may transmit transmission scheduling information to the AP 702 through the first antenna 411. The transmission scheduling information may include information indicating a communication scheme in which each of a plurality of antennas being the first and second antennas 411 and 412 communicates during at least one period. For example, the transmission scheduling information may include information about at least one period during which at least one of the first and second antennas 411 and 412 communicates with the AP 702 in the WiFi communication scheme. The electronic device 101, for example, the communication control module 420 may receive a response signal to the transmitted transmission scheduling information from the AP 702. The transmission of the transmission scheduling information from the electronic device 101 in operation 1110 may be performed during or before a first period 1181.

In operation 1112, the electronic device 101, for example, the communication control module 420 may communicate with the AP 702 through the first antenna 411 in the WiFi communication scheme. In operation 1114, the electronic device 101, for example, the communication control module 420 may communicate with the AP 702 through the second antenna 412 in the WiFi communication scheme. Operations 1112 and 1114 may be included in the first period 1181. Accordingly, the electronic device 101, for example, the communication control module 420 may communicate with the AP 702 through the first and second antennas 411 and 412 in the WiFi communication scheme during the first period 1181.

In operation 1118, the electronic device 101, for example, the communication control module 420 may communicate with the AP 702 through the first antenna 411 in the WiFi communication scheme. In operation 1120, the electronic device 101, for example, the communication control module 420 may communicate with the Bluetooth device 704 through the second antenna 412 in the Bluetooth communication scheme. Operations 1118 and 1120 may be included in a second period 1182. Accordingly, the electronic device 101, for example, the communication control module 420 may communicate, during the second period 1182, with the AP 702 through the first antenna 411 in the WiFi communication scheme, and with the Bluetooth device 704 through the second antenna 412 in the Bluetooth communication scheme.

In operation 1124, the electronic device 101, for example, the communication control module 420 may communicate with the AP 702 through the first antenna 411 in the WiFi communication scheme. In operation 1126, the electronic device 101, for example, the communication control module 420 may communicate with the AP 702 through the second antenna 412 in the WiFi communication scheme. Operations 1124 and 1126 may be included in a third period 1183. Accordingly, the electronic device 101, for example, the communication control module 420 may communicate with the AP 702 through the first and second antennas 411 and 412 in the WiFi communication scheme during the third period 1183.

In operation 1130, the electronic device 101, for example, the communication control module 420 may communicate with the AP 702 through the first antenna 411 in the WiFi communication scheme. In operation 1132, the electronic device 101, for example, the communication control module 420 may communicate with the Bluetooth device 704 through the second antenna 412 in the Bluetooth communication scheme. Operations 1130 and 1132 may be included in a fourth period 1184. Accordingly, the electronic device 101, for example, the communication control module 420 may communicate, during the fourth period 1184, with the AP 702 through the first antenna 411 in the WiFi communication scheme, and with the Bluetooth device 704 through the second antenna 412 in the Bluetooth communication scheme.

The electronic device 101, for example, the communication control module 420 may repeat the above-described procedure. Therefore, the electronic device 101, for example, the communication control module 420 may also repeat the above-described procedure during an $n^{th}$ period 1188 and an $(n+1)^{th}$ period 1189.

In operation 1136, the electronic device 101, for example, the communication control module 420 may communicate with the AP 702 through the first antenna 411 in the WiFi communication scheme. In operation 1138, the electronic device 101, for example, the communication control module 420 may communicate with the AP 702 through the second antenna 412 in the WiFi communication scheme. Operations 1136 and 1138 may be included in the $n^{th}$ period 1188. Accordingly, the electronic device 101, for example, the communication control module 420 may communicate with the AP 702 through the first and second antennas 411 and 412 in the WiFi communication scheme during the $n^{th}$ period 1188.

In operation 1142, the electronic device 101, for example, the communication control module 420 may communicate with the AP 702 through the first antenna 411 in the WiFi communication scheme. In operation 1144, the electronic device 101, for example, the communication control module 420 may communicate with the Bluetooth device 704 through the second antenna 412 in the Bluetooth communication scheme. Operations 1142 and 1144 may be included in the $(n+1)^{th}$ period 1189. Accordingly, the electronic device 101, for example, the communication control module 420 may communicate, during the $(n+1)^{th}$ period 1189, with the AP 702 through the first antenna 411 in the WiFi communication scheme, and with the Bluetooth device 704 through the second antenna 412 in the Bluetooth communication scheme.

The electronic device 101 according to various embodiments may operate every predetermined period based on scheduling information for communication conducted by using a plurality of antennas simultaneously in one communication scheme, which will be described with reference to FIG. 12.

Figure 12:
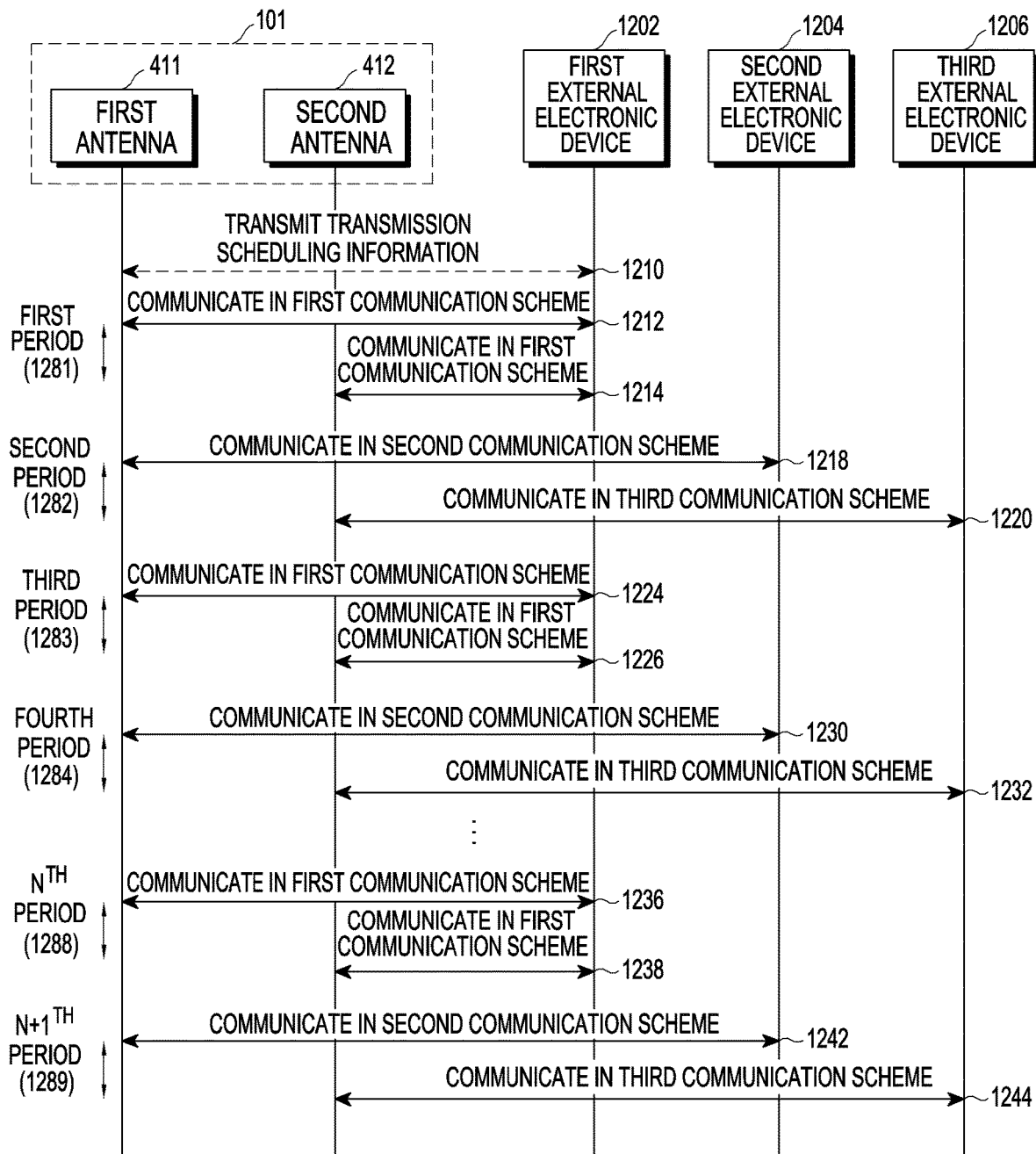
FIG. 12 is a flowchart illustrating a method for operating an electronic device according to various embodiments of the disclosure.

FIG. 12 is a flowchart illustrating a method for operating an electronic device according to various embodiments of the disclosure.

In operation 1210, the electronic device 101, for example, the communication control module 420 may transmit transmission scheduling information to a first external electronic device 1202 through the first antenna 411. The transmission scheduling information may include information about a communication scheme in which each of a plurality of antennas being the first and second antennas 411 and 412 communicates during at least one period. For example, the transmission scheduling information may include information about at least one period during which the first and second antennas 411 and 412 communicate with the first external electronic device 1202 in the first communication scheme. The electronic device 101, for example, the communication control module 420 may receive a response signal to the transmitted transmission scheduling information from the first external electronic device 1202. The transmission of the transmission scheduling information from the electronic device 101 in operation 1210 may be performed during or before a first period 1281.

In operation 1212, the electronic device 101, for example, the communication control module 420 may communicate with the first external electronic device 1202 through the first antenna 411 in the first communication scheme. In operation 1214, the electronic device 101, for example, the communication control module 420 may communicate with the first external electronic device 1202 through the second antenna 412 in the first communication scheme. Operations 1212 and 1214 may be included in the first period 1281. Accordingly, the electronic device 101, for example, the communication control module 420 may communicate with the first external electronic device 1202 through the first and second antennas 411 and 412 in the first communication scheme during the first period 1281. The first communication scheme may be a communication scheme for which a plurality of antennas may be used. For example, the first communication scheme may be a communication scheme for which a single antenna or dual antennas may be used.

In operation 1218, the electronic device 101, for example, the communication control module 420 may communicate with a second external electronic device 1204 through the first antenna 411 in the second communication scheme. In operation 1220, the electronic device 101, for example, the communication control module 420 may communicate with a third external electronic device 1206 through the second antenna 412 in a third communication scheme. Operations 1218 and 1220 may be included in a second period 1282. Accordingly, the electronic device 101, for example, the communication control module 420 may communicate, during the second period 1282, with the second external electronic device 1204 through the first antenna 411 in the second communication scheme, and with the third external electronic device 1206 through the second antenna 412 in the third communication scheme.

In operation 1224, the electronic device 101, for example, the communication control module 420 may communicate with the first external electronic device 1202 through the first antenna 411 in the first communication scheme. In operation 1226, the electronic device 101, for example, the communication control module 420 may communicate with the first external electronic device 1202 through the second antenna 412 in the first communication scheme. Operations 1224 and 1226 may be included in a third period 1283. Accordingly, the electronic device 101, for example, the communication control module 420 may communicate with the first external electronic device 1202 through the first and second antennas 411 and 412 in the first communication scheme during the third period 1283.

In operation 1230, the electronic device 101, for example, the communication control module 420 may communicate with the second external electronic device 1204 through the first antenna 411 in the second communication scheme. In operation 1232, the electronic device 101, for example, the communication control module 420 may communicate with the third external electronic device 1206 through the second antenna 412 in the third communication scheme. Operations 1230 and 1232 may be included in a fourth period 1284. Accordingly, the electronic device 101, for example, the communication control module 420 may communicate, during the fourth period 1284, with the second external electronic device 1204 through the first antenna 411 in the second communication scheme, and with the third external electronic device 1206 through the second antenna 412 in the third communication scheme.

The electronic device 101, for example, the communication control module 420 may repeat the above-described procedure. Therefore, electronic device 101, for example, the communication control module 420 may also repeat the above-described procedure during an $n^{th}$ period 1288 and an $(n+1)^{th}$ period 1289.

In operation 1236, the electronic device 101, for example, the communication control module 420 may communicate with the first external electronic device 1202 through the first antenna 411 in the first communication scheme. In operation 1238, the electronic device 101, for example, the communication control module 420 may communicate with the first external electronic device 1202 through the second antenna 412 in the first communication scheme. Operations 1236 and 1238 may be included in the $n^{th}$ period 1288. Accordingly, the electronic device 101, for example, the communication control module 420 may communicate with the first external electronic device 1202 through the first and second antennas 411 and 412 in the first communication scheme during the $n^{th}$ period 1288.

In operation 1242, the electronic device 101, for example, the communication control module 420 may communicate with the second external electronic device 1204 through the first antenna 411 in the second communication scheme. In operation 1244, the electronic device 101, for example, the communication control module 420 may communicate with the third external electronic device 1206 through the second antenna 412 in the third communication scheme. Operations 1242 and 1244 may be included in the $(n+1)^{th}$ period 1289. Accordingly, the electronic device 101, for example, the communication control module 420 may communicate, during the $(n+1)^{th}$ period 1289, with the second external electronic device 1204 through the first antenna 411 in the second communication scheme, and with the third external electronic device 1206 through the second antenna 412 in the third communication scheme.

Meanwhile, the electronic device 101 may transmit the afore-described dual stream signal to an external electronic device, instead of the transmission scheduling information. According to an embodiment, the electronic device 101, for example, the communication control module 420 may transmit the dual stream notification signal to the first external electronic device 1202 through the first antenna 411. The dual stream notification signal may be a signal indicating communication through a plurality of antennas, for example, the first antenna 411 and the second antenna 412. The electronic device 101, for example, the communication control module 420 may receive a response signal to the transmitted dual stream notification signal from the first external electronic device 1202. The transmission of the dual stream notification signal from the electronic device 101 may be performed during or before each of the first period 1281, the third period 1283, and the $n^{th}$ period 1288. This operation has been described before in detail and thus will not be described herein.

Figure 13:
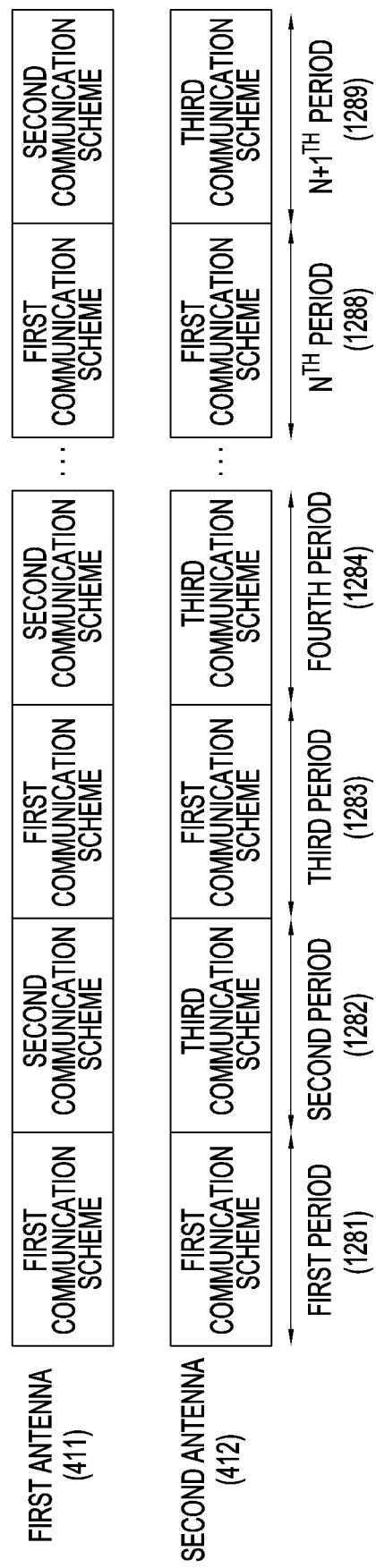
FIG. 13 is a conceptual view illustrating communication through a plurality of antennas according to various embodiments of the disclosure.

FIG. 13 is a conceptual view illustrating communication through a plurality of antennas according to various embodiments of the disclosure.

Referring to FIG. 13, the electronic device 101, for example, the communication control module 420 may communicate through the first antenna 411 and the second antenna 412 in the first communication scheme during the first period 1281, the third period 1283, and the $n^{th}$ period 1288. Further, the electronic device 101, for example, the communication control module 420 may communicate through the first antenna 411 in the second communication scheme, and through the second antenna 412 in the third communication scheme, during the second period 1282, the fourth period 1284, and the $(n+1)^{th}$ period 1289.

Accordingly, the electronic device 101, for example, the communication control module 420 may communicate through the first antenna 411 and the second antenna 412 in the first communication scheme during the first period 1281, the third period 1283, and the $n^{th}$ period 1288. The electronic device 101, for example, the communication control module 420 may communicate through the first antenna 411 in the second communication scheme, and through the second antenna 412 in the third communication scheme, during the second period 1282, the fourth period 1284, and the $(n+1)^{th}$ period 1289.

As described above, the electronic device according to various embodiments of the disclosure may simultaneously communicate in different communication schemes through each of a plurality of antennas.

An embodiment of the foregoing operation method according to various embodiments of the disclosure will be described.

Figure 14:
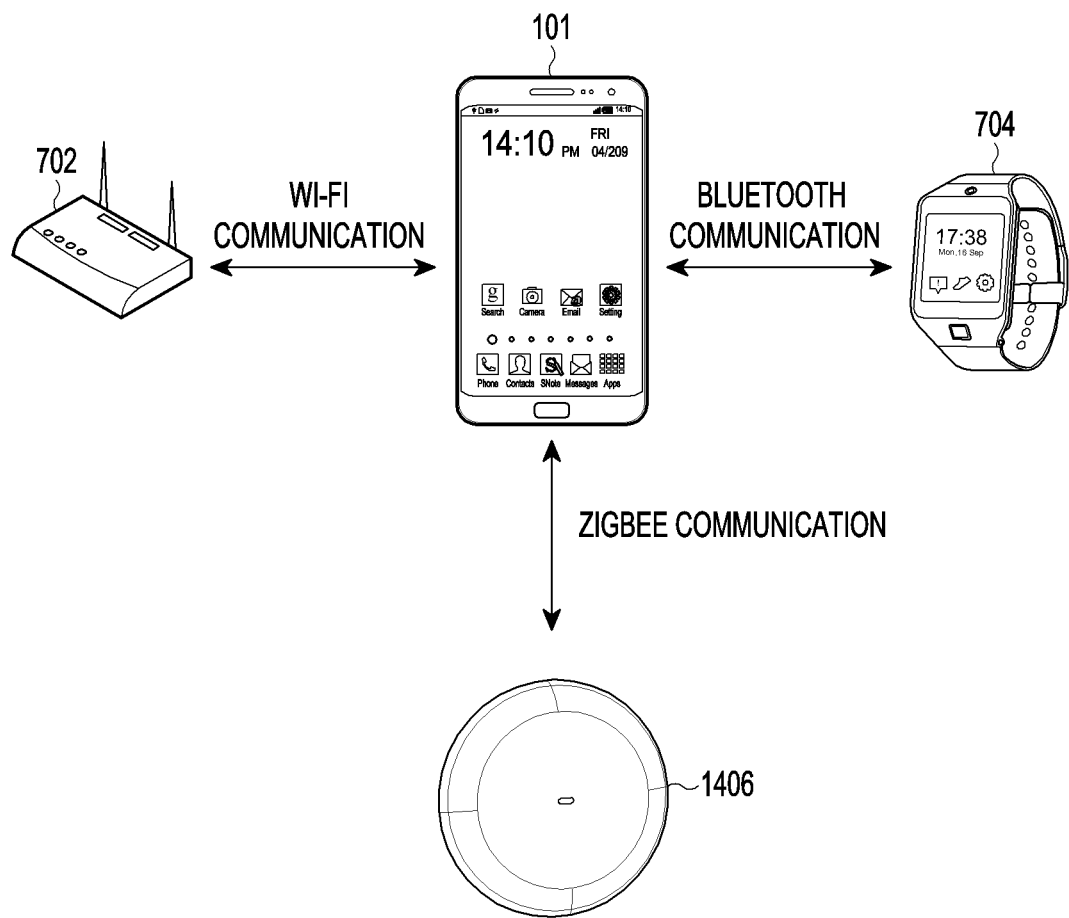
FIG. 14 is an exemplary view illustrating a communication method of an electronic device according to various embodiments of the disclosure.

FIG. 14 is an exemplary view illustrating a communication method of an electronic device according to various embodiments of the disclosure.

The electronic device 101 may communicate simultaneously with a plurality of external electronic devices, i.e., the AP 702, the Bluetooth device 704, and a Zigbee device 1406. The electronic device 101, for example, the communication module 170 may communicate with the AP 702 in the WiFi communication scheme, with the Bluetooth device 704 in the Bluetooth communication scheme, and with the Zigbee device 1406 in a Zigbee communication scheme.

Figure 15:
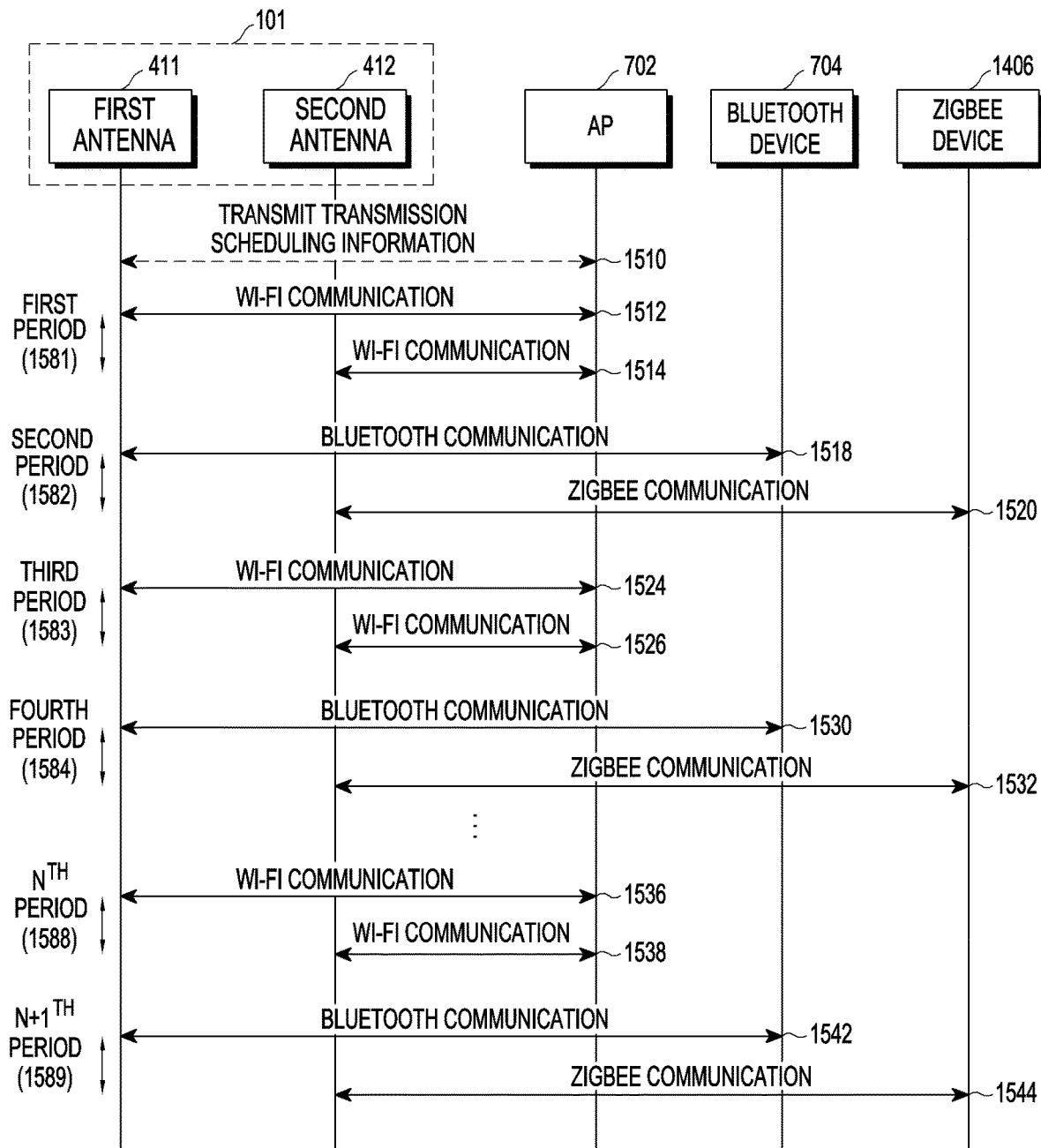
FIG. 15 is a flowchart illustrating a communication method of an electronic device according to various embodiments of the disclosure.

FIG. 15 is a flowchart illustrating a communication method of an electronic device according to various embodiments of the disclosure.

In operation 1510, the electronic device 101, for example, the communication control module 420 may transmit transmission scheduling information to the AP 702 through the first antenna 411. The transmission scheduling information may include information about a communication scheme in which each of a plurality of antennas being the first and second antennas 411 and 412 communicates during at least one period. For example, the transmission scheduling information may include information about at least one period during which the first and second antennas 411 and 412 communicate with the AP 702 in the WiFi communication scheme. The electronic device 101, for example, the communication control module 420 may receive a response signal to the transmitted transmission scheduling information from the AP 702. The transmission of the transmission scheduling information from the electronic device 101 in operation 1510 may be performed during or before a first period 1581.

In operation 1512, the electronic device 101, for example, the communication control module 420 may communicate with the AP 702 through the first antenna 411 in the WiFi communication scheme. In operation 1514, the electronic device 101, for example, the communication control module 420 may communicate with the AP 702 through the second antenna 412 in the WiFi communication scheme. Operations 1512 and 1514 may be included in the first period 1581. Accordingly, the electronic device 101, for example, the communication control module 420 may communicate with the AP 702 through the first and second antennas 411 and 412 in the WiFi communication scheme during the first period 1581.

In operation 1518, the electronic device 101, for example, the communication control module 420 may communicate with the Bluetooth device 704 through the first antenna 411 in the Bluetooth communication scheme. In operation 1520, the electronic device 101, for example, the communication control module 420 may communicate with the Zigbee device 1406 through the second antenna 412 in the Zigbee communication scheme. Operations 1518 and 1520 may be included in a second period 1582. Accordingly, the electronic device 101, for example, the communication control module 420 may communicate, during the second period 1582, with the Bluetooth device 704 through the first antenna 411 in the Bluetooth communication scheme, and with the Zigbee device 1406 through the second antenna 412 in the Zigbee communication scheme.

In operation 1524, the electronic device 101, for example, the communication control module 420 may communicate with the AP 702 through the first antenna 411 in the WiFi communication scheme. In operation 1526, the electronic device 101, for example, the communication control module 420 may communicate with the AP 702 through the second antenna 412 in the WiFi communication scheme. Operations 1524 and 1526 may be included in a third period 1583. Accordingly, the electronic device 101, for example, the communication control module 420 may communicate with the AP 702 through the first and second antennas 411 and 412 in the WiFi communication scheme during the third period 1583.

In operation 1530, the electronic device 101, for example, the communication control module 420 may communicate with the Bluetooth device 704 through the first antenna 411 in the Bluetooth communication scheme. In operation 1532, the electronic device 101, for example, the communication control module 420 may communicate with the Zigbee device 1406 through the second antenna 412 in the Zigbee communication scheme. Operations 1530 and 1532 may be included in a fourth period 1584. Accordingly, the electronic device 101, for example, the communication control module 420 may communicate, during the fourth period 1584, with the Bluetooth device 704 through the first antenna 411 in the Bluetooth communication scheme, and with the Zigbee device 1406 through the second antenna 412 in the Zigbee communication scheme.

The electronic device 101, for example, the communication control module 420 may repeat the above-described procedure. Therefore, electronic device 101, for example, the communication control module 420 may also repeat the above-described procedure during an $n^{th}$ period 1588 and an $(n+1)^{th}$ period 1589.

In operation 1536, the electronic device 101, for example, the communication control module 420 may communicate with the AP 702 through the first antenna 411 in the WiFi communication scheme. In operation 1538, the electronic device 101, for example, the communication control module 420 may communicate with the AP 702 through the second antenna 412 in the WiFi communication scheme. Operations 1536 and 1538 may be included in the $n^{th}$ period 1588.

Accordingly, the electronic device 101, for example, the communication control module 420 may communicate with the AP 702 through the first and second antennas 411 and 412 in the WiFi communication scheme during the $n^{th}$ period 1588.

In operation 1542, the electronic device 101, for example, the communication control module 420 may communicate with the Bluetooth device 704 through the first antenna 411 in the Bluetooth communication scheme. In operation 1544, the electronic device 101, for example, the communication control module 420 may communicate with the Zigbee device 1406 through the second antenna 412 in the Zigbee communication scheme. Operations 1542 and 1544 may be included in the $(n+1)^{th}$ period 1589. Accordingly, the electronic device 101, for example, the communication control module 420 may communicate, during the $(n+1)^{th}$ period 1589, with the Bluetooth device 704 through the first antenna 411 in the Bluetooth communication scheme, and with the Zigbee device 1406 through the second antenna 412 in the Zigbee communication scheme.

Meanwhile, the electronic device 101 may transmit the afore-described dual stream signal to an external electronic device, instead of the transmission scheduling information. According to an embodiment, the electronic device 101, for example, the communication control module 420 may transmit the dual stream notification signal to the AP 702 through the first antenna 411. The dual stream notification signal may be a signal indicating communication through a plurality of antennas, for example, the first antenna 411 and the second antenna 412. The electronic device 101, for example, the communication control module 420 may receive a response signal to the transmitted dual stream notification signal from the AP 702. The transmission of the dual stream notification signal from the electronic device 101 may be performed during or before each of the first period 1581, the third period 1583, and the $n^{th}$ period 1588. This operation has been described before in detail and thus will not be described herein.

Figure 16:
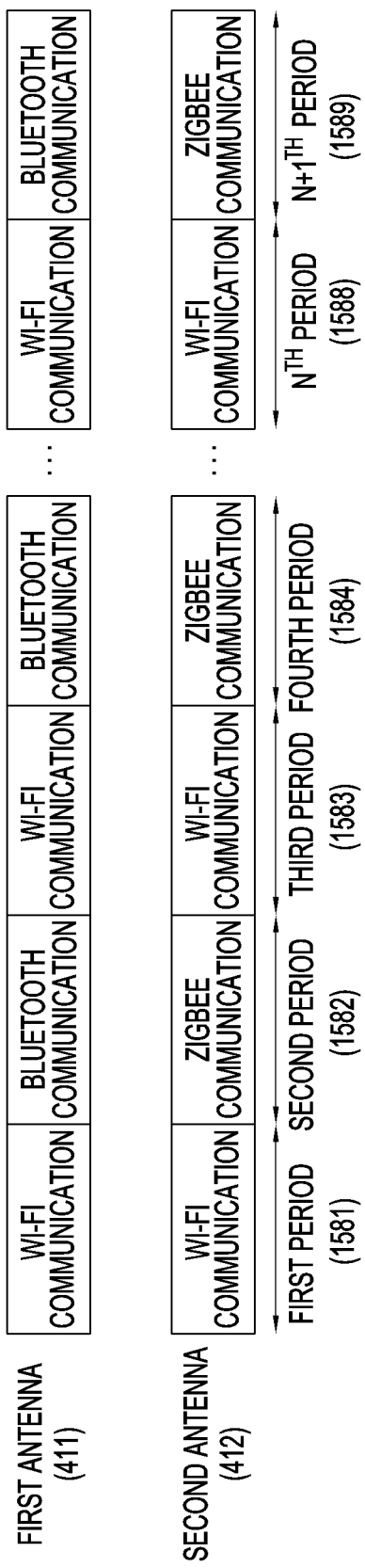
FIG. 16 is a conceptual view illustrating communication through a plurality of antennas according to various embodiments of the disclosure.

FIG. 16 is a conceptual view illustrating communication through a plurality of antennas according to various embodiments of the disclosure.

Referring to FIG. 16, the electronic device 101, for example, the communication control module 420 may communicate through the first antenna 411 and the second antenna 412 in the WiFi communication scheme during the first period 1581, the third period 1583, and the $n^{th}$ period 1588. Further, the electronic device 101, for example, the communication control module 420 may communicate through the first antenna 411 in the Bluetooth communication scheme, and through the second antenna 412 in the Zigbee communication scheme, during the second period 1582, the fourth period 1584, and the $(n+1)^{th}$ period 1589.

Accordingly, the electronic device 101, for example, the communication control module 420 may communicate through the first antenna 411 and the second antenna 412 in the WiFi communication scheme during the first period 1581, the third period 1583, and the $n^{th}$ period 1588. The electronic device 101, for example, the communication control module 420 may communicate through the first antenna 411 in the Bluetooth communication scheme, and through the second antenna 412 in the Zigbee communication scheme, during the second period 1582, the fourth period 1584, and the $(n+1)^{th}$ period 1589.

As described above, the electronic device according to various embodiments of the disclosure may simultaneously communicate in different communication schemes through each of a plurality of antennas.

The electronic device 101 according to various embodiments may receive a combo mode setting for communication in a plurality of communication schemes through the afore-described plurality of antennas, and operate according to the received setting.

Figure 17:
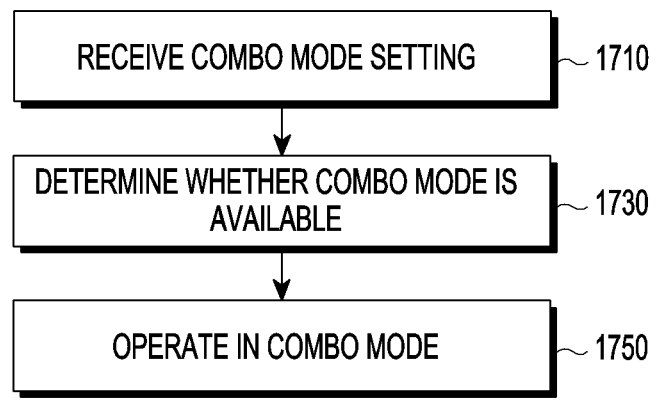
FIG. 17 is a flowchart illustrating a method for operating an electronic device according to various embodiments of the disclosure.

FIG. 17 is a flowchart illustrating a method for operating an electronic device according to various embodiments of the disclosure.

In operation 1710, the electronic device 101, for example, the processor 120 may acquire a combo mode setting input. A combo mode may refer to a mode in which communication is conducted in a plurality of communication schemes through the plurality of antennas 410 in the electronic device 101. According to an embodiment, the combo mode may be a mode in which the electronic device 101 communicates through the plurality of antennas 410 in a plurality of communication schemes selected from among WiFi communication, Bluetooth communication, and Zigbee communication.

According to an embodiment, the electronic device 101 may receive an input asking whether to operate in the combo mode, and receive the input for each of the plurality of communication schemes.

Figure 18:
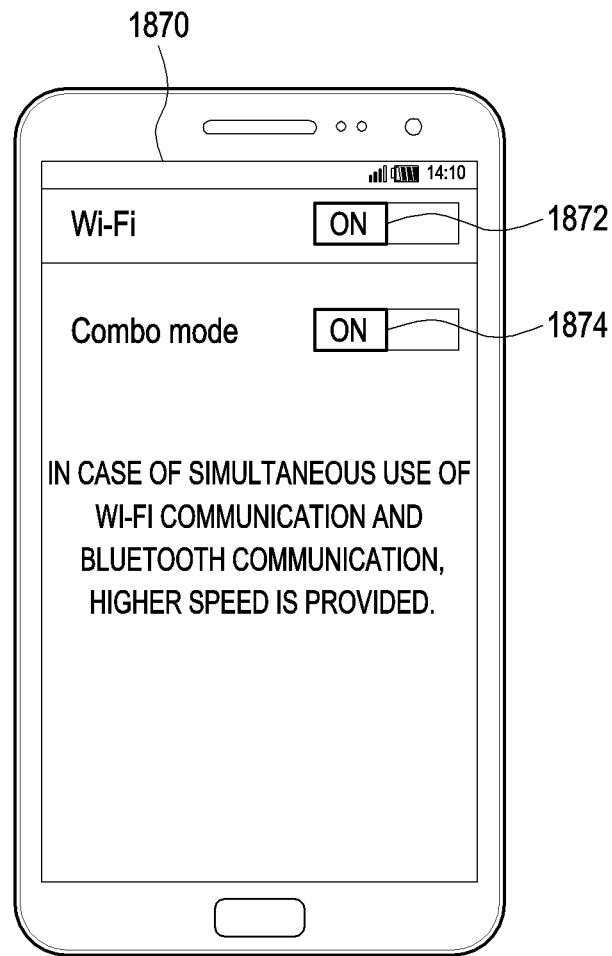
FIG. 18 is an exemplary view illustrating a combo mode setting screen according to various embodiments of the disclosure.

FIG. 18 is an exemplary view illustrating a combo mode setting screen according to various embodiments of the disclosure.

Referring to FIG. 18, the electronic device 101, for example, the processor 120 may display a combo mode setting screen 1870 on the display 160. The electronic device 101, for example, the processor 120 may display a WiFi tab 1872 indicating use or non-use of WiFi communication, and use WiFi communication based on an input to the WiFi tab 1872. When WiFi communication is used, the electronic device 101, for example, the processor 120 may display a combo mode tab 1874 asking whether to operate in the combo mode, and operate by communication other than WiFi communication based on an input to the combo mode tab 1874, for example, in the above-described combo mode if Bluetooth communication is also used simultaneously with WiFi communication. The electronic device 101, for example, the processor 120 may display a description of the combo mode on the combo mode setting screen 1870.

Reference will be made again to FIG. 17.

In operation 1730, the electronic device 101, for example, the processor 120 may determine whether the combo mode is available for communication through the plurality of antennas in the plurality of communication schemes, based on the input combo mode setting. In operation 1750, if the combo mode is available, the electronic device 101, for example, the processor 120 may operate in the combo mode for communication through the plurality of antennas 410 in the plurality of communication schemes.

According to an embodiment, the electronic device 101, for example, the processor 120 may determine whether the combo mode using the plurality of communication schemes has been set based on the combo mode setting. Further, the electronic device 101, for example, the processor 120 may determine whether a plurality of intended communication schemes have been set to be performed in the combo mode. If the plurality of intended communication schemes have been set to be performed in the combo mode, the electronic device 101, for example, the processor 120 may communicate through the plurality of antennas 410 in the plurality of communication schemes.

When operating in the combo mode, the electronic device 101 according to various embodiments may display a combo mode operation indication.

Figure 19:
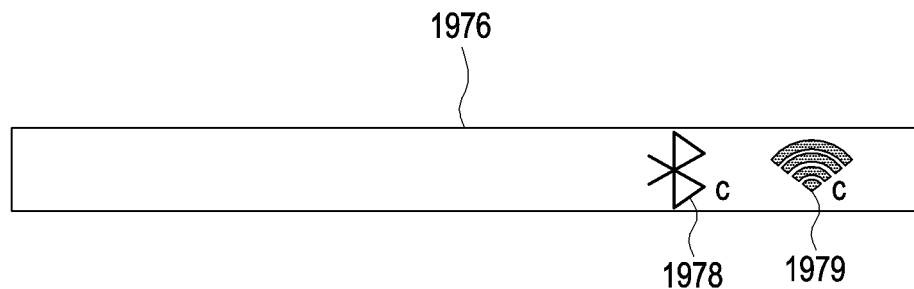
FIG. 19 is an exemplary view illustrating a combo mode operation indication according to various embodiments of the disclosure.

FIG. 19 is an exemplary view illustrating a combo mode operation indication according to various embodiments of the disclosure.

The electronic device 101, for example, the processor 120 may display a status bar 1976 on the display 160. According to an embodiment, when operating in the combo mode, for example, in a plurality of communication schemes being Bluetooth communication and WiFi communication, the electronic device 101, for example, the processor 120 may display, in the status bar 1976, a Bluetooth combo mode indication 1978 indicating that Bluetooth communication is conducted in the combo mode, and a WiFi combo mode indication 1979 indicating that WiFi communication is conducted in the combo mode.

If the combo mode is available, the electronic device 101 according to various embodiments may visually indicate that the electronic device 101 is capable of operating in the combo mode, and upon acquisition of a combo mode operation input, may operate in the combo mode, which will be described with reference to FIGS. 20 to 22.

Figure 20:
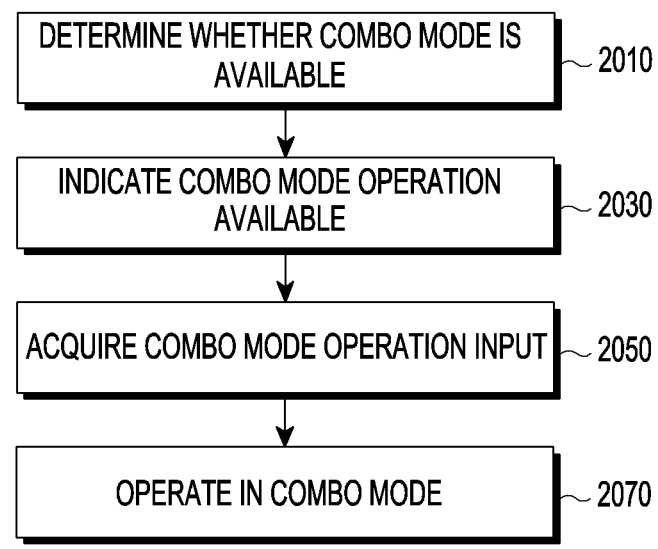
FIG. 20 is a flowchart illustrating a method for operating an electronic device according to various embodiments of the disclosure.

FIG. 20 is a flowchart illustrating a method for operating an electronic device according to various embodiments of the disclosure.

In operation 2010, the electronic device 101, for example, the processor 120 may determine whether the combo mode for communication through the plurality of antennas 410 in a plurality of communication schemes is available. The determination as to whether the combo mode is available in the electronic device 101 has been described before in detail, and thus will not be described herein.

In operation 2030, if determining that the combo mode is available, the electronic device 101, for example, the processor 120 may visually indicate that the combo mode is available. According to an embodiment, the electronic device 101, for example, the processor 120 may display a pop-up window indicating that the combo mode is available on the display 160.

In operation 2050, the electronic device 101, for example, the processor 120 may acquire a combo mode operation input for operation in the combo mode. According to an embodiment, the electronic device 101, for example, the processor 120 may acquire the combo mode operation input from the displayed pop-up window. Specifically, the electronic device 101, for example, the processor 120 may display a menu for an input asking whether to operate in the combo mode on a combo mode pop-up window 2170, and operate in the combo mode based on an input to the displayed menu. The menu for the input asking whether to operate in the combo mode may be a menu for receiving a one-time selection of the combo mode operation, or a menu for receiving a setting for the combo mode operation. In operation 2070, the electronic device 101, for example, the processor 120 may operate in combo mode based on acquiring a combo mode operation input for operation in the combo mode.

Figure 21:
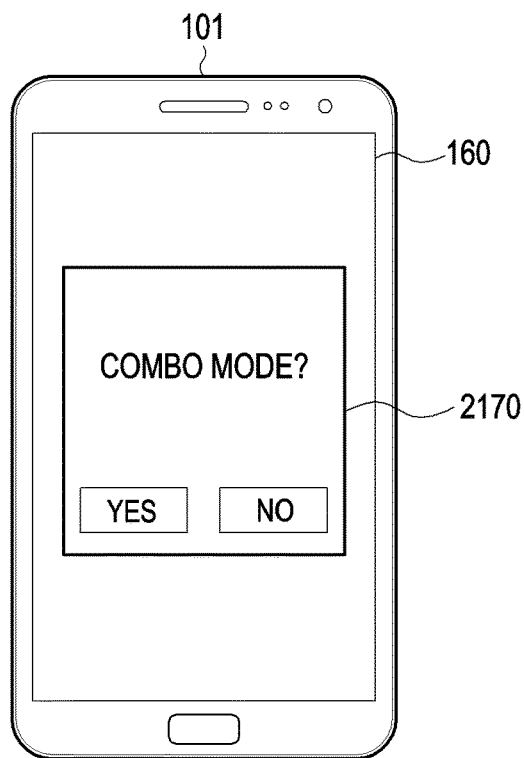
FIGS. 21 and 22 are exemplary views illustrating display of a combo mode pop-up window according to various embodiments of the disclosure.
Figure 22:
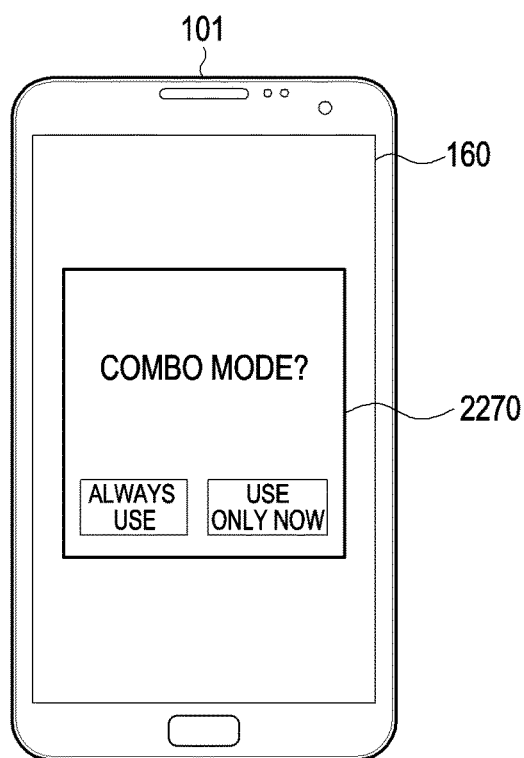

With reference to FIGS. 21 and 22, display of a pop-up window and acquisition of an input in the electronic device 101 will be described.

FIGS. 21 and 22 are exemplary views illustrating display of combo mode pop-up windows according to various embodiments of the disclosure.

Referring to FIG. 21, the electronic device 101, for example, the processor 120 may display, on the display 160, a combo mode pop-up window 2170 indicating that the combo mode is available. The electronic device 101, for example, the processor 120 may display a menu for an input asking whether to operate in the combo mode, for example, "Yes" or "No" on the combo mode pop-up window 2170. Upon acquisition of an input selecting the menu item "Yes", the electronic device 101, for example, the processor 120 may operate in the combo mode.

Referring to FIG. 22, the electronic device 101, for example, the processor 120 may display, on the display 160, the combo mode pop-up window 2170 indicating that the combo mode is available. The electronic device 101, for example, the processor 120 may display a menu for an input asking whether to operate in the combo mode, for example, "Always Use" or "Use Only Now" on the combo mode pop-up window 2170. Upon acquisition of an input selecting the menu item "Always Use", the electronic device 101, for example, the processor 120 may operate in the combo mode since the input, in spite of the absence of the input for the combo mode later. Upon acquisition of an input selecting the menu item "Use Only Now", the electronic device 101, for example, the processor 120 may operate in the combo mode in an on-going application only during a predetermined time or only for a predetermined operation.

According to various embodiments of the disclosure, a method for operating an electronic device having a plurality of antennas including a first antenna and a second antenna may include communicating with a first external electronic device through the first antenna and the second antenna in a first communication scheme during a first period, and communicating with the first external electronic device through the first antenna in the first communication scheme, and with a second external electronic device through the second antenna in a second communication scheme, during a second period.

According to various embodiments of the disclosure, the communication with a first external electronic device through the first antenna and the second antenna in a first communication scheme during a first period may include transmitting a dual stream transmission notification signal indicating transmission through at least two antennas to the first external electronic device.

According to various embodiments of the disclosure, the communication with the first external electronic device through the first antenna in the first communication scheme, and with a second external electronic device through the second antenna in a second communication scheme, during a second period may include transmitting a single stream transmission notification signal indicating transmission through a single antenna to the first external electronic device.

According to various embodiments of the disclosure, the method may further include transmitting, to the first external electronic device, transmission scheduling information including information about a communication scheme using each of the plurality of antennas.

According to various embodiments of the disclosure, the information about the communication scheme using each of the plurality of antennas may include information about at least one communication scheme and an operation period which use each of the plurality of antennas.

According to various embodiments of the disclosure, each of the first communication scheme and the second communication scheme may be one of WiFi communication, Bluetooth communication, and Zigbee communication, and the first communication scheme and the second communication scheme may be different.

According to various embodiments of the disclosure, a method for operating an electronic device having a plurality of antennas including a first antenna and a second antenna may include communicating with a first external electronic device through the first antenna and the second antenna in a first communication scheme during a first period, and communicating with a second external electronic device through the first antenna in a second communication scheme, and with a third external electronic device through the second antenna in a third communication scheme, during a second period.

According to various embodiments of the disclosure, the communication with a first external electronic device through the first antenna and the second antenna in a first communication scheme during a first period may include transmitting a dual stream transmission notification signal indicating transmission through at least two antennas to the first external electronic device.

According to various embodiments of the disclosure, the method may further include transmitting, to the first external electronic device, transmission scheduling information including information about an operation period during which communication is conducted through the plurality of antennas in the first communication scheme.

According to various embodiments of the disclosure, each of the first communication scheme, the second communication scheme, and the third communication scheme may be one of WiFi communication, Bluetooth communication, and Zigbee communication, and the first communication scheme, the second communication scheme, and the third communication scheme may be different.

According to various embodiments of the disclosure, an electronic device may include a plurality of antennas including a first antenna and a second antenna, a communication module configured to communicate through the plurality of antennas in at least one communication scheme, a memory, and a processor connected electrically to the memory. The memory may store instructions which, when executed, cause the processor to communicate, through the communication module, with a first external electronic device through the first antenna and the second antenna in a first communication scheme during a first period, and to communicate, through the communication module, with the first external electronic device through the first antenna in the first communication scheme, and with a second external electronic device through the second antenna in a second communication scheme, during a second period.

According to various embodiments of the disclosure, the memory may store instructions which, when executed, cause the processor to transmit a dual stream transmission notification signal indicating transmission through at least two antennas to the first external electronic device through the communication module.

According to various embodiments of the disclosure, the memory may store instructions which, when executed, cause the processor to transmit a single stream transmission notification signal indicating transmission through a single antenna to the first external electronic device through the communication module.

According to various embodiments of the disclosure, the memory may store instructions which, when executed, cause the processor to transmit, to the first external electronic device through the communication module, transmission scheduling information including information about a communication scheme using each of the plurality of antennas.

According to various embodiments of the disclosure, the information about the communication scheme using each of the plurality of antennas may include information about at least one communication scheme and an operation period which use each of the plurality of antennas.

According to various embodiments of the disclosure, each of the first communication scheme and the second communication scheme may be one of WiFi communication, Bluetooth communication, and Zigbee communication, and the first communication scheme and the second communication scheme may be different.

According to various embodiments of the disclosure, an electronic device may include a plurality of antennas including a first antenna and a second antenna, a communication module configured to communicate through the plurality of antennas in at least one communication scheme, a memory, and a processor connected electrically to the memory. The memory may store instructions which, when executed, cause the processor to communicate, through the communication module, with a first external electronic device through the first antenna and the second antenna in a first communication scheme during a first period, and to communicate, through the communication module, with a second external electronic device through the first antenna in a second communication scheme, and with a third external electronic device through the second antenna in a third communication scheme, during a second period.

According to various embodiments of the disclosure, the memory may store instructions which, when executed, cause the processor to transmit a dual stream transmission notification signal indicating transmission through at least two antennas to the first external electronic device through the communication module.

According to various embodiments of the disclosure, the memory may store instructions which, when executed, cause the processor to transmit, to the first external electronic device through the communication module, transmission scheduling information including information about an operation period during which communication is conducted through the plurality of antennas in the first communication scheme.

According to various embodiments of the disclosure, each of the first communication scheme, the second communication scheme, and the third communication scheme may be one of WiFi communication, Bluetooth communication, and Zigbee communication, and the first communication scheme, the second communication scheme, and the third communication scheme may be different.

The embodiments disclosed in the present document are provided for description and understanding of the disclosed technology, not limiting the scope of the disclosure. Therefore, the scope of the disclosure should be interpreted to embrace all modifications or various other embodiments based on the technical spirit of the disclosure.

The invention claimed is:

1. A method for operating an electronic device comprising a plurality of antennas including a first antenna and a second antenna, the method comprising:
controlling to communicate with a first external electronic device, using the first antenna, according to a first communication scheme, for each of a plurality of consecutive time periods;
controlling to communicate with the first external electronic device, using the second antenna, according to the first communication scheme during first ones of the plurality of consecutive times periods; and
controlling to communicate with a second external electronic device, using the second antenna, according to a second communication scheme, during second ones of the plurality of consecutive time periods, wherein the first ones of the plurality of consecutive times periods alternate with the second ones of the plurality of consecutive times periods.

2. The method of claim 1, further comprising controlling to transmit, to the first external electronic device, a dual stream transmission notification signal indicating transmission through at least two antennas for the first ones of plurality of consecutive time periods.

3. The method of claim 1, further comprising controlling to transmit, to the first external electronic device, a single stream transmission notification signal indicating transmission through a single antenna for the second ones of the plurality of consecutive time periods.

4. The method of claim 1, further comprising transmitting, to the first external electronic device, transmission scheduling information including communication scheme information for the plurality of antennas.

5. The method of claim 1, wherein each of the first communication scheme and the second communication scheme is one of WiFi communication, Bluetooth communication, or Zigbee communication, and the first communication scheme and the second communication scheme are different.

6. A method for operating an electronic device comprising a plurality of antennas including a first antenna and a second antenna, the method comprising:
controlling to communicate with a first external electronic device, using the first antenna, according to a first communication scheme, during first ones of a plurality of consecutive time periods;
controlling to communicate with a second external electronic device, using the first antenna, according to a second communication scheme, during second ones of the plurality of consecutive time periods;
controlling to communicate with the first external device, using the second antenna, according to the first communication scheme, during the first ones of the plurality of consecutive time periods; and
controlling to communicate with a third external electronic device, using the second antenna, according to a third communication scheme, during the second ones of the plurality of consecutive time periods,
wherein the first ones of the plurality of consecutive time periods alternate with the second ones of the plurality of consecutive time periods.

7. The method of claim 6, further comprising transmitting, to the first external electronic device, transmission scheduling information including information about the first ones of the time periods during which the communicating is controlled to use the first and second antennas according to the first communication scheme.

8. An electronic device comprising:
a plurality of antennas including a first antenna and a second antenna;
a communication circuit configured to communicate through the plurality of antennas in at least one communication scheme;
a memory; and
a processor connected electrically to the memory,
wherein the memory stores instructions which, when executed, cause the processor to:
control to communicate, through the communication circuit, with a first external electronic device, using the first antenna, according to a first communication scheme, for each of a plurality of consecutive time periods, and control to communicate, through the communication circuit, with the first external electronic device, using the second antenna, according to the first communication scheme, during first ones of the plurality of consecutive time periods; and
control to communicate, through the communication circuit, with a second external electronic device, using the second antenna, according to a second communication scheme, during second ones of the plurality of consecutive time periods,
wherein the first ones of the plurality of consecutive time periods alternate with the second ones of the plurality of consecutive time periods.

9. The electronic device of claim 8, wherein the memory stores instructions which, when executed, cause the processor to control to transmit, to the first external electronic device, through the communication circuit, a dual stream transmission notification signal indicating transmission through at least two antennas for the first ones of the plurality of consecutive time periods.

10. The electronic device of claim 8, wherein the memory stores instructions which, when executed, cause the processor to control to transmit, to the first external electronic device, through the communication circuit, a single stream transmission notification signal indicating transmission through a single antenna for the second ones of the plurality of consecutive time periods.

11. The electronic device of claim 8, wherein the memory stores instructions which, when executed, cause the processor to control to transmit, to the first external electronic device, through the communication circuit, transmission scheduling information including information about a communication scheme using each of the plurality of antennas.

12. The electronic device of claim 8, wherein each of the first communication scheme and the second communication scheme is one of WiFi communication, Bluetooth communication, or Zigbee communication, and the first communication scheme and the second communication scheme are different.

13. An electronic device comprising:
a plurality of antennas including a first antenna and a second antenna;
a communication circuit configured to communicate through the plurality of antennas in at least one communication scheme;
a memory; and
a processor connected electrically to the memory,
wherein the memory stores instructions which, when executed, cause the processor to:
control to communicate, through the communication circuit, with a first external electronic device, using the first antenna, according to a first communication scheme, during the first ones of a plurality of consecutive time periods;
control to communicate with a second external electronic device, using the first antenna, according to a second communication scheme, during second ones of the plurality of consecutive time periods;
control to communicate, through the communication circuit, with the first external electronic device, using the second antenna, according to the first communication scheme, during the first ones of the plurality of consecutive time periods; and
control to communicate, through the communication circuit, with a third external electronic device, using the second antenna, according to a third communication scheme, during the second ones of the plurality of consecutive periods, wherein the first ones of the plurality of consecutive time periods alternate with the second ones of the plurality of consecutive time periods.

14. The electronic device of claim 13, wherein the memory stores instructions which, when executed, cause the processor to control to transmit, to the first external electronic device, through the communication circuit, transmission scheduling information including information about the first ones of the time periods during which the communicating is controlled to use the first and second antennas according to the first communication scheme.

15. The electronic device of claim 13, wherein each of the first communication scheme, the second communication scheme, and the third communication scheme is one of WiFi communication, Bluetooth communication, or Zigbee communication, and the first communication scheme, the second communication scheme, and the third communication scheme are different.

* * * * *